US008258413B2

(12) United States Patent
Ito et al.

(10) Patent No.: US 8,258,413 B2
(45) Date of Patent: Sep. 4, 2012

(54) VEHICLE SEAT LOAD DETECTION DEVICE HAVING INTERSPACE TO RECEIVE PROJECTING PORTION SCRAPED OFF FROM PRESS-FITTED SHAFT MEMBER

(75) Inventors: Koji Ito, Yatomi (JP); Muneto Inayoshi, Nagoya (JP); Kan Ichihara, Kariya (JP); Yoshimasa Asano, Kariya (JP); Hiroyuki Fujii, Kariya (JP); Naoka Kawajiri, Kariya (JP); Takeshi Kuwabara, Gifu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 197 days.

(21) Appl. No.: 12/618,045

(22) Filed: Nov. 13, 2009

(65) Prior Publication Data

US 2010/0122854 A1 May 20, 2010

(30) Foreign Application Priority Data

Nov. 19, 2008 (JP) ................................. 2008-295242
Nov. 19, 2008 (JP) ................................. 2008-295255

(51) Int. Cl.
*B60N 2/44* (2006.01)
*G01G 19/12* (2006.01)
*G01G 19/52* (2006.01)

(52) U.S. Cl. ....... 177/136; 177/144; 296/68.1; 403/274; 403/280; 403/282; 29/525; 180/273; 280/735; 73/781; 73/862.474; 73/862.629

(58) Field of Classification Search .................. 177/136, 177/144, DIG. 9; 73/781, 862.474, 862.629–862.634; 180/273; 280/735; 403/274, 278, 279, 280, 281, 282; 29/525; 296/63, 65.03, 66, 68.1
See application file for complete search history.

(56) References Cited

U.S. PATENT DOCUMENTS 3,456,972 A * 7/1969 Drotar ........................ 403/408.1
(Continued)

FOREIGN PATENT DOCUMENTS

JP 2001-150997 A 6/2001
(Continued)

OTHER PUBLICATIONS

U.S. Appl. No. 12/628,777, filed Dec. 1, 2009, Ito et al.
(Continued)

*Primary Examiner* — Randy W Gibson
(74) *Attorney, Agent, or Firm* — Buchanan Ingersoll & Rooney PC

(57) ABSTRACT

A load detection device for a vehicle seat mounted between a floor side mounting mechanism and a seat side mounting mechanism and measuring a load applied by an occupant seated on the vehicle seat, includes a shaft member adapted to be fixed to one of the floor side mounting mechanism and the seat side mounting mechanism, a strain generating member fixed to the shaft member and including a hole into which the shaft member is press-fitted, a strain gauge attached to the strain generating member, the shaft member of which surface hardness is specified to be lower than a surface hardness of the hole and including a scraping projecting portion scraped off by means of the hole in a case where the shaft member is press-fitted to the hole, and an inter space formed between the strain generating member and the shaft member and positioned next to the scraping projecting portion.

19 Claims, 11 Drawing Sheets

U.S. PATENT DOCUMENTS

| | | | |
|---|---|---|---|
| 4,728,216 A * | 3/1988 | Disborg | 403/282 |
| 4,936,149 A * | 6/1990 | Jacobson | 73/768 |
| 5,158,390 A * | 10/1992 | Ito et al. | 403/282 |
| 5,478,975 A * | 12/1995 | Ford | 177/210 FP |
| 5,716,154 A * | 2/1998 | Miller et al. | 403/22 |
| 6,565,159 B1 * | 5/2003 | Kosak | 301/132 |
| 6,652,031 B2 * | 11/2003 | Villarroel et al. | 297/367 R |
| 6,786,104 B1 | 9/2004 | Aoki | |
| 6,840,119 B2 | 1/2005 | Aoki | |
| 7,155,981 B2 | 1/2007 | Matsuura et al. | |
| 7,189,931 B2 * | 3/2007 | Hida et al. | 177/144 |
| 7,487,687 B2 | 2/2009 | Sumi et al. | |
| 7,490,523 B2 | 2/2009 | Sakamoto et al. | |
| 7,520,175 B2 * | 4/2009 | Matsukawa et al. | 73/774 |
| 7,555,960 B2 | 7/2009 | Nakano et al. | |
| 7,559,249 B2 | 7/2009 | Nakano et al. | |
| 2003/0106723 A1 * | 6/2003 | Thakur et al. | 177/144 |
| 2004/0035224 A1 * | 2/2004 | Kajiyama et al. | 73/862.474 |
| 2007/0269155 A1 * | 11/2007 | Mori et al. | 384/544 |
| 2009/0064792 A1 | 3/2009 | Kawabata et al. | |
| 2009/0126500 A1 | 5/2009 | Ito et al. | |

FOREIGN PATENT DOCUMENTS

| | | |
|---|---|---|
| JP | 2003-83707 A | 3/2003 |
| JP | 2008-132968 A | 6/2008 |
| JP | 2008-132969 A | 6/2008 |
| JP | 2008-134226 A | 6/2008 |
| JP | 2008-134232 A | 6/2008 |

OTHER PUBLICATIONS

U.S. Appl. No. 12/618,006, filed Nov. 13, 2009, Maeta et al.
U.S. Appl. No. 12/618,045, filed Nov. 13, 2009, Ito et al.

* cited by examiner

FIG. 8A    FIG. 8B    FIG. 8C
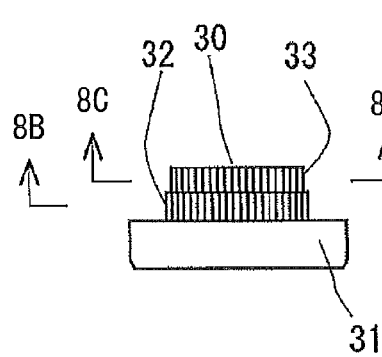
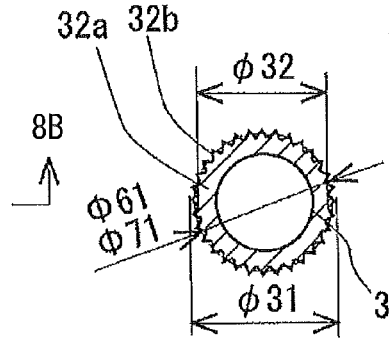
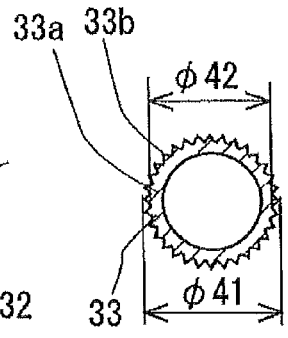
FIG. 9A    FIG. 9B    FIG. 9C
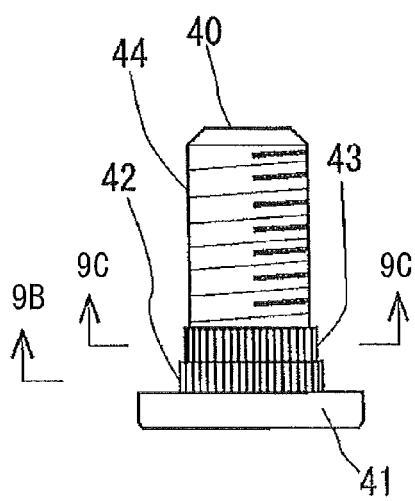
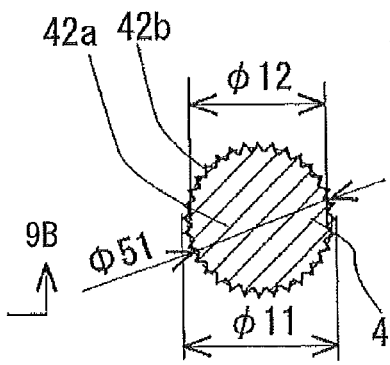
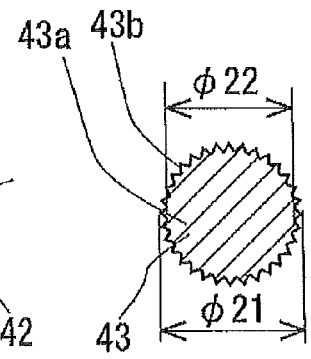

F I G. 10
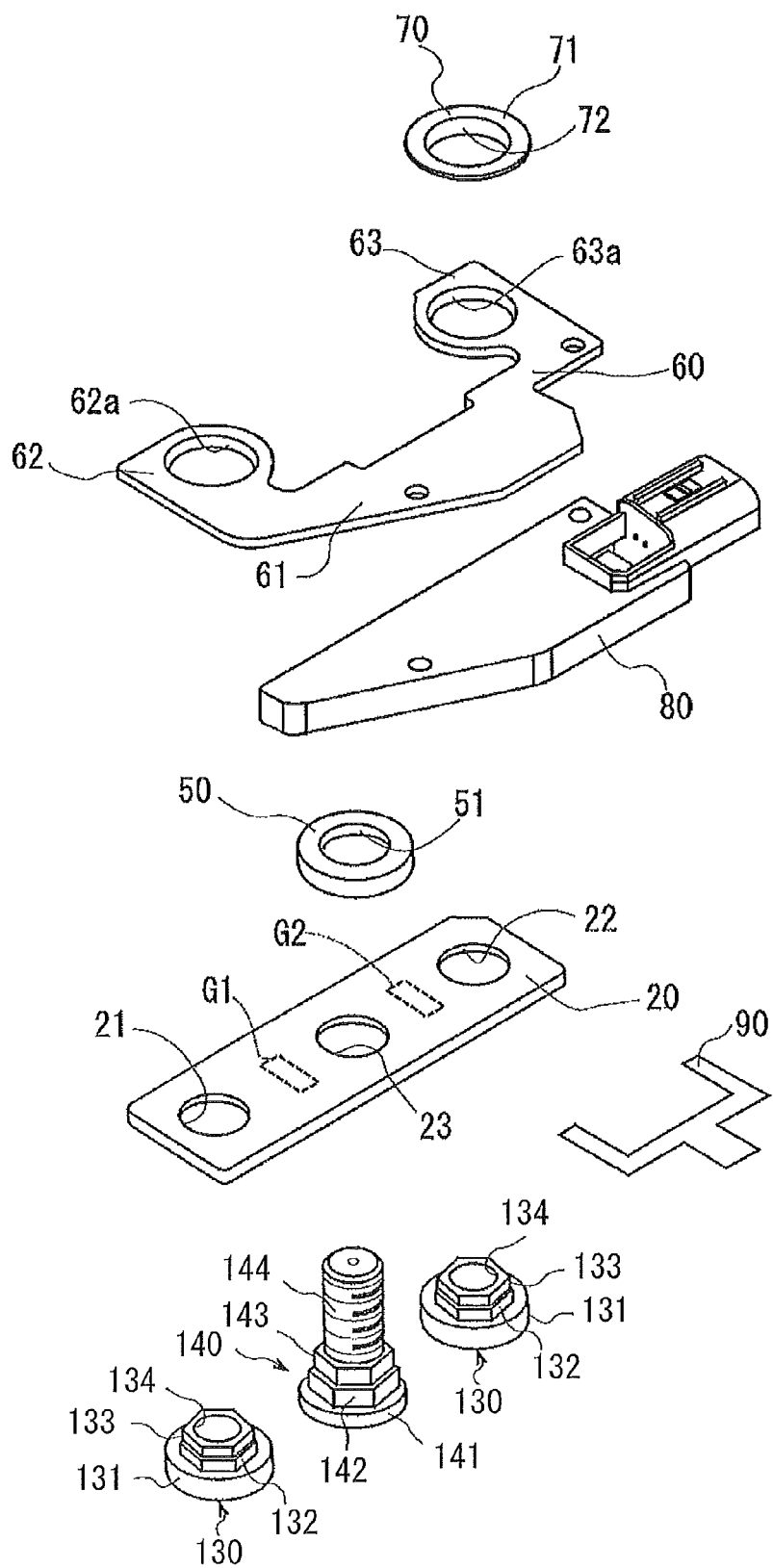

VEHICLE SEAT LOAD DETECTION DEVICE HAVING INTERSPACE TO RECEIVE PROJECTING PORTION SCRAPED OFF FROM PRESS-FITTED SHAFT MEMBER

CROSS REFERENCE TO RELATED APPLICATIONS

This application is based on and claims priority under 35 U.S.C. §119 to Japanese Patent Application 2008-295255, filed on Nov. 19, 2008 and 2008-295242, filed on Nov. 19, 2008, the entire contents of which are incorporated herein by reference.

TECHNICAL FIELD

This disclosure relates to a load detection device for a vehicle seat.

BACKGROUND DISCUSSION

JP2003-83707A discloses a strain generating member (sensor board) including a detection hole at a center, and first and second fixing holes at both sides of the detection hole. A shaft-shaped detection member is press-fitted to the detection hole to which an external force is applied. In addition, shaft-shaped first and second fixed members are press-fitted to the first and second fixing holes, respectively, to which a reaction force is applied. First, second, third and fourth strain gauges are provided between the detection hole and the first and second fixing holes. The first to fourth strain gauges are connected to each other by means of a circuit pattern so as to constitute a bridge circuit. The external force received by the detection member is measured on the basis of an output from the bridge circuit.

According to the structure of the aforementioned strain member, each of the shaft-shaped members (i.e., the detection member and the fixed members) is press-fitted to each of the holes (i.e., the detection hole and the fixing holes). The shaft member is press-fitted to the hole over an entire periphery. Thus, an entire inner periphery of each of the holes receives a pressing force from each of the shaft members. As a result, an internal stress is generated at the strain generating member by means of the press-fitting of the shaft members. The internal stress influences a detection accuracy of the strain gauges attached to the strain generating member. The detection accuracy of the strain gauges also influences a detection accuracy of a passenger seated on a seat for a vehicle.

A need thus exists for a load detection device for a vehicle seat which is not susceptible to the drawback mentioned above.

SUMMARY

According to an aspect of this disclosure, a load detection device for a vehicle seat mounted between a floor side mounting mechanism and a seat side mounting mechanism and measuring a load applied by an occupant seated on the vehicle seat, includes a shaft member adapted to be fixed to one of the floor side mounting mechanism and the seat side mounting mechanism, a strain generating member fixed to the shaft member and including a hole into which the shaft member is press-fitted for fixing the strain generating member to the shaft member, a strain gauge attached to the strain generating member, the shaft member of which surface hardness is specified to be lower than a surface hardness of the hole of the strain generating member and including a scraping projecting portion scraped off by means of the hole in a case where the shaft member is press-fitted to the hole, and an inter space formed between the strain generating member and the shaft member and positioned next to the scraping projecting portion.

BRIEF DESCRIPTION OF THE DRAWINGS

The foregoing and additional features and characteristics of this disclosure will become more apparent from the following detailed description considered with the reference to the accompanying drawings, wherein:

FIG. 8A is a side view of a lower bush according to the first embodiment, FIG. 8B is a cross-sectional view taken along line 8B-8B in FIG. 8A, and FIG. 8C is a cross-sectional view taken along line 8C-8C in FIG. 8A;

FIG. 9A is a side view of a connection shaft according to the first embodiment, FIG. 9B is a cross-sectional view taken along line 9B-9B in FIG. 9A, and FIG. 9C is a cross-sectional view taken along line 9C-9C in FIG. 9A;

FIG. 10 is an exploded perspective view of the load detection device according to a second embodiment disclosed here;

DETAILED DESCRIPTION

Embodiments disclosed here will be explained with reference to the attached drawings. In the embodiments, directions or orientations such as left, right, front, rear, top, and bottom correspond to those when viewed from a passenger seated on a seat for a vehicle.

[First Embodiment]

A structure of a seat apparatus for a vehicle on which a load detection device according to a first embodiment is mounted will be explained with reference to FIGS. 1 and 2.

Figure 1:
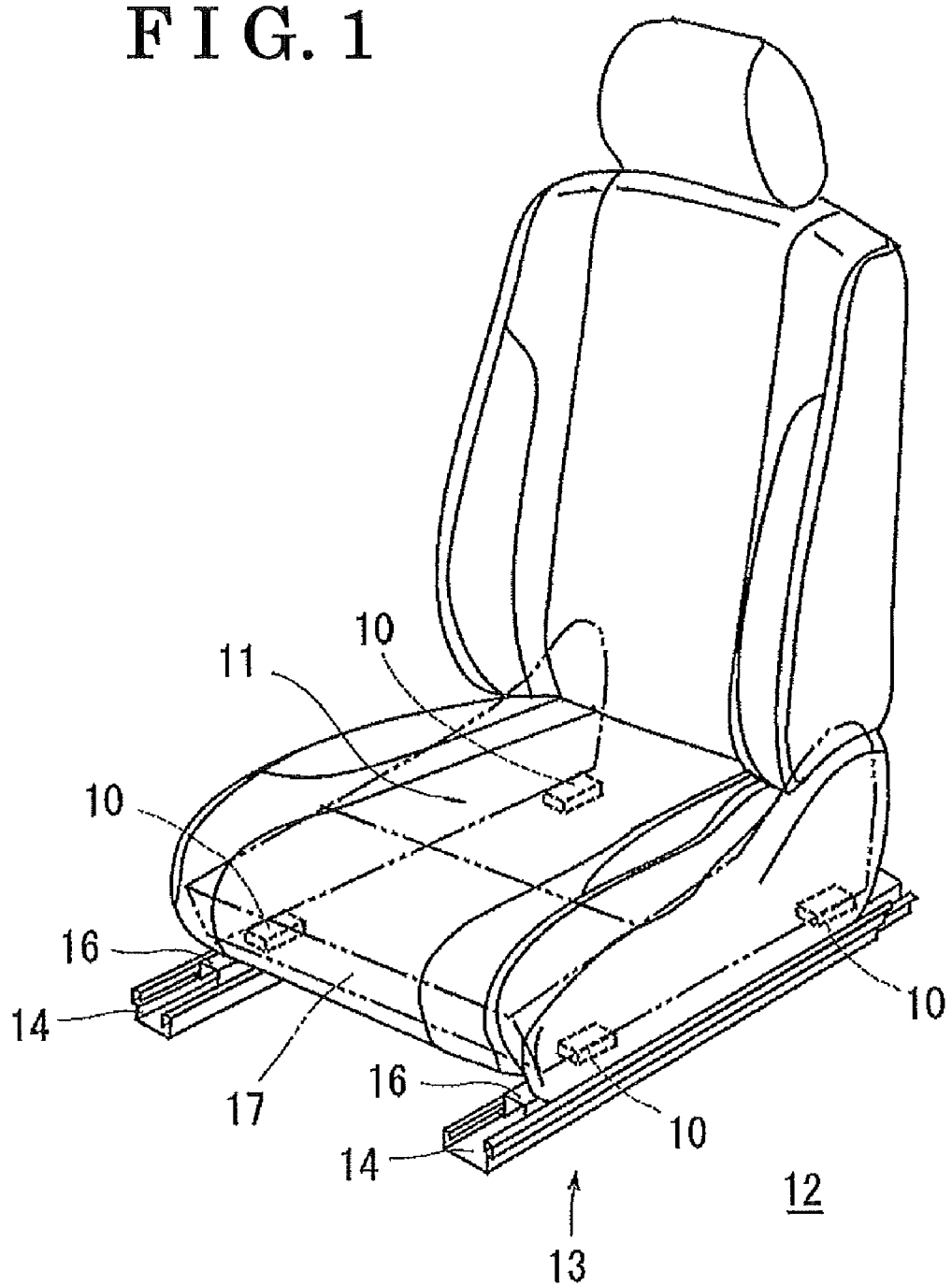
FIG. 1 is a perspective view of a seat apparatus for a vehicle according to a first embodiment disclosed here.
Figure 2:
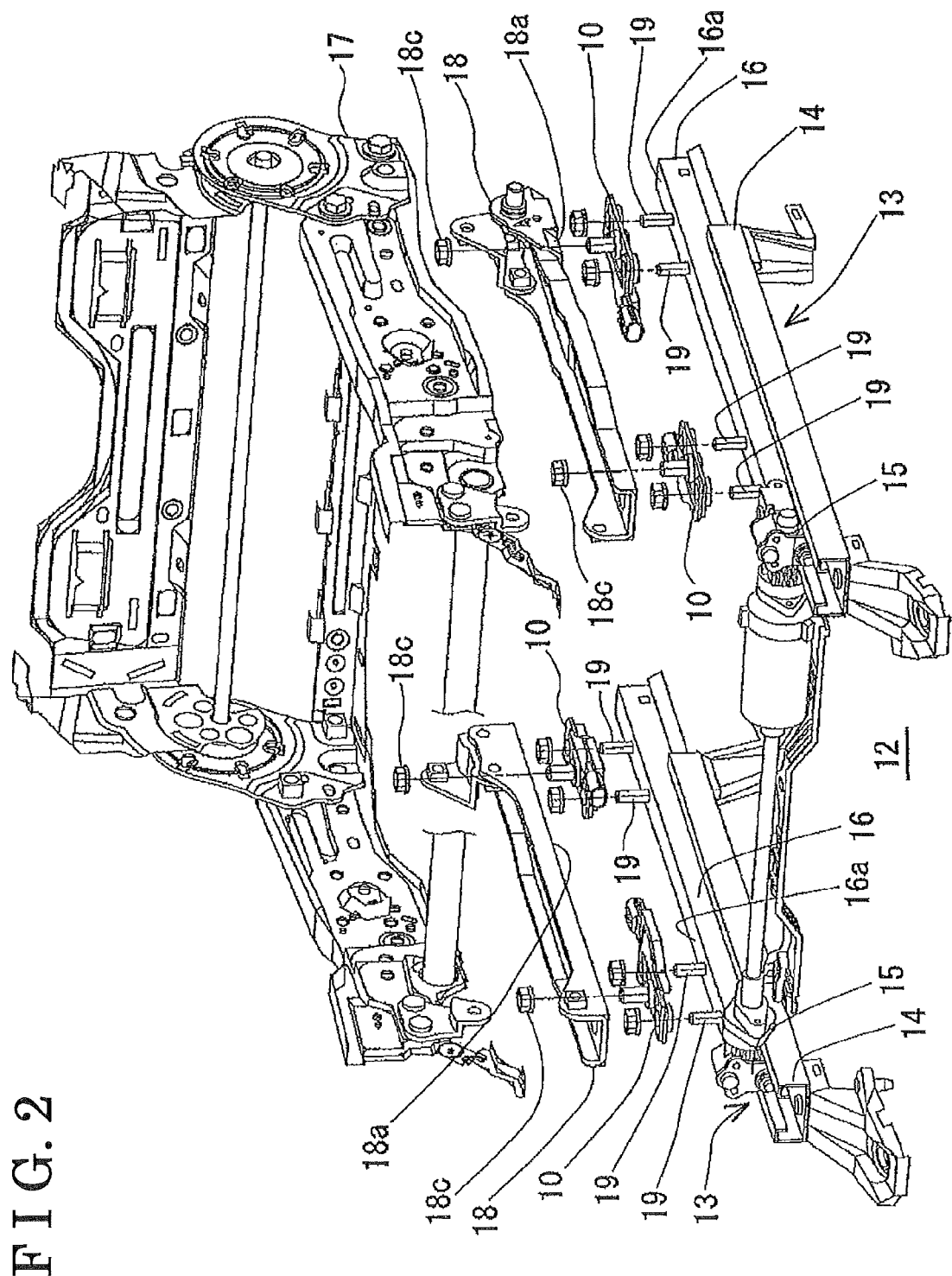
FIG. 2 is an exploded perspective view of a frame portion of the seat apparatus according to the first embodiment.

As illustrated in FIGS. 1 and 2, the seat apparatus includes a pair of seat slide apparatuses (i.e., left and right seat slide apparatuses) 13, a seat frame main body 17, a pair of seat frame portions (i.e., left and right seat frame portions) 18, and four load detection devices 10.

The left and right seat slide apparatuses 13 are provided for adjusting and fixing a position of a vehicle seat 11 relative to a vehicle floor 12. Each of the seat slide apparatuses 13 includes a lower rail 14, an upper rail 16 serving as a floor side mounting mechanism, and the like. Two lower rails, i.e., left and right lower rails 14, provided at the left and right seat slide apparatuses 13 are fixed to the vehicle floor 12 and arranged in parallel to each other so as to extend in a longitudinal direction of a vehicle. In addition, the left and right lower rails 14 are arranged to be spaced away from each other by a distance corresponding to a lateral width of the vehicle seat 11. Two upper rails, i.e., left and right upper rails 16, are movably supported relative to the left and right lower rails 14 in the longitudinal direction of the vehicle. Each of the upper rails 16 is locked relative to each of the lower rails 14 at an adjusted position by a lock mechanism 15. A pair of fixed shafts 19 for fixing each of the load detection devices 10 is fixedly provided, projecting vertically, at a fitting surface 16a formed at an upper surface of each of the upper rails 16. Specifically, two of the fixed shafts 19 are provided at a front end of the fitting surface 16a while having a predetermined distance therebetween in the longitudinal direction of the vehicle, and another two of the fixed shafts 19 are provided at a rear end of the fitting surface 16a while having the predetermined distance therebetween in the longitudinal direction of the vehicle.

The seat frame main body 17 supports a seat cushion portion of the vehicle seat 11 on which a passenger is seated. A reclining mechanism of the vehicle seat 11 is provided at a rear edge of the seat frame main body 17. Each of the seat frame portions 18 is formed into a rail shape having a substantially U-shape in a cross section. The left and right seat frame portions 18 are fixed at left and right edges of a lower surface of the seat frame main body 17 so that openings of the respective seat frame portions 18 in the cross section face upward and the seat frame portions 18 extend in the longitudinal direction of the vehicle. Connection holes 18b into which connection shafts 40 (see FIG. 6, which will be explained later) are inserted are respectively formed at front and rear ends of a fitting surface 18a formed at a lower surface of each of the seat frame portions 18. The seat frame portions 18 each serve as a seat side mounting mechanism.

The load detection devices 10 measure a load of an occupant or passenger seated on the vehicle seat 11. The four load detection devices 10 are disposed between the fitting surfaces 16a of the upper rails 16 and the fitting surfaces 18a of the seat frame portions 18 so as to support the seat frame portions 18 relative to the upper rails 16. Specifically, two of the load detection devices 10 are mounted between front ends of the respective upper rails 16 and front ends of the respective seat frame portions 18 while another two of the load detection devices 10 are mounted between rear ends of the respective upper rails 16 and rear ends of the respective seat frame portions 18. That is, the four load detection devices 10 are provided in such a manner that four corners, i.e., front-left, front-right, rear-left, and rear-right, of the lower surface of the seat frame main body 17 are supported by the upper rails 16.

Each of the load detection devices 10 is fixed to the pair of fixed shafts 19 fixedly provided in a projecting manner at the upper rail 16. The connection shaft 40, provided at each of the load detection devices 10, is fixedly inserted into the connection hole 18b formed at the seat frame portion 18.

Next, an entire structure of each of the load detection devices 10 will be explained with reference to FIG. 3. A state where the load detection device 10 is fixed to the upper rail 16 will be explained with reference to FIG. 4.

Figure 3:
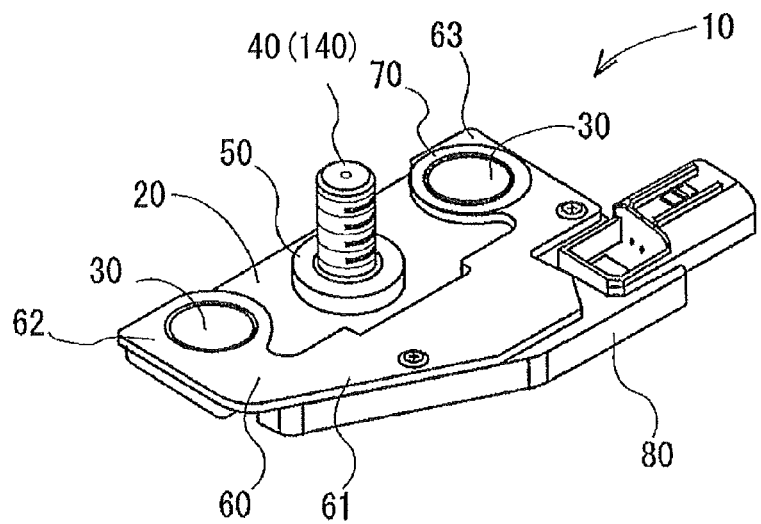
FIG. 3 is a perspective view of a load detection device according to the first embodiment.
Figure 4:
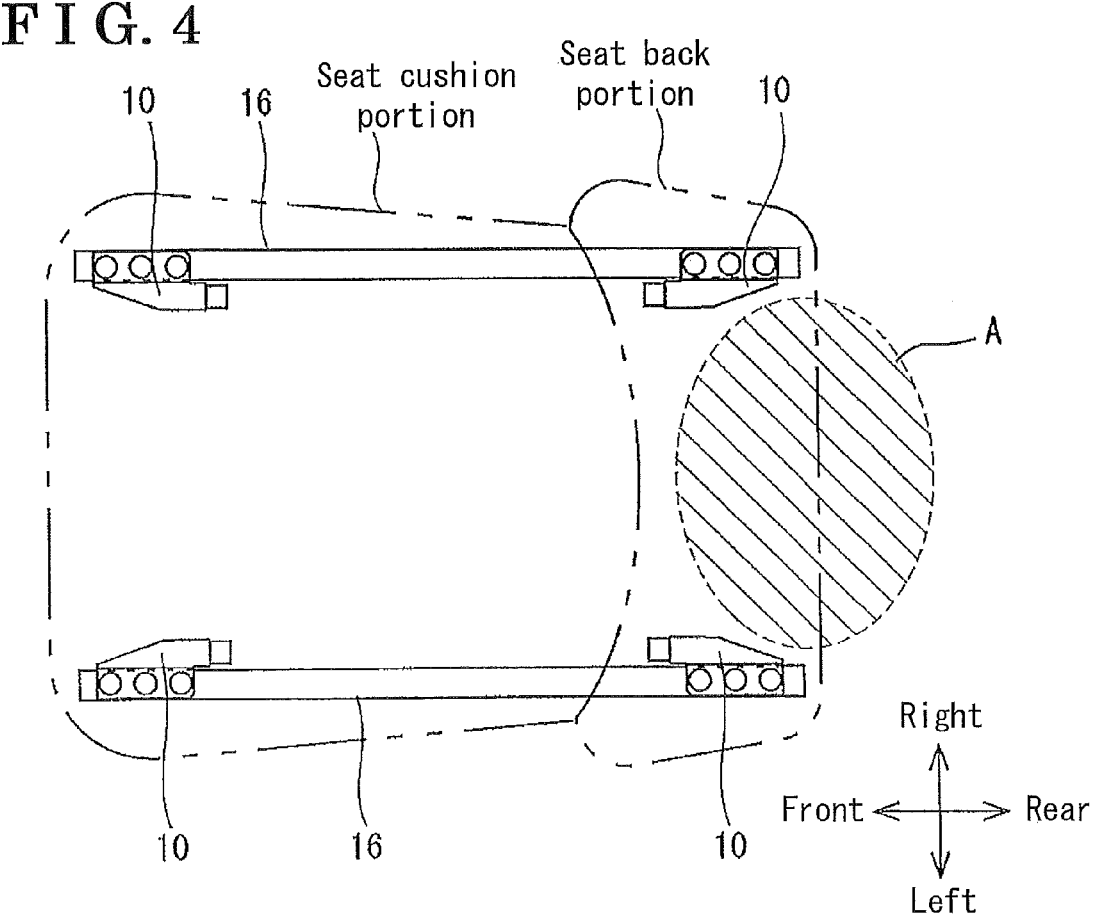
FIG. 4 is a plan view of the seat apparatus showing upper rails and the load detection devices according to the first embodiment.

As illustrated in FIG. 3, the load detection device 10 has substantially a flat shape as a whole. Specifically, the load detection device 10 is formed into an elongated rectangular plate shape of which one corner is chamfered so as to greatly incline (front side in FIG. 3). In addition, the load detection device 10 includes a projecting portion (right rear side in FIG. 3) projecting from an opposite end in a longitudinal direction from an end where the chamfered portion is formed. The load detection device 10 shown in FIG. 3 is arranged at the front end of the right upper rail 16 and the rear end of the left upper rail 16. As illustrated in FIG. 4, the load detection device 10 arranged at the rear end of the right upper rail 16 faces the load detection device 10 shown in FIG. 3 arranged at the rear end of the left upper rail 16 in such a manner to mirror each other. In addition, the load detection device 10 arranged at the front end of the left upper rail 16 faces the load detection device 10 shown in FIG. 3 arranged at the front end of the right upper rail 16 in such a manner to mirror each other.

That is, in any of the load detection devices 10, a portion excluding the chamfered portion and the projecting portion is sandwiched between the fitting surface 16a of the upper rail 16 and the fitting surface 18a of the seat frame portion 18 as illustrated in FIG. 4. The chamfered portion and the projecting portion of the load detection device 10 extend inward in the lateral direction of the vehicle seat 11. In particular, in each of the load detection devices 10 arranged at the rear of the vehicle, the chamfered portion is positioned rearward while the projecting portion is positioned forward. On the other hand, in each of the load detection devices 10 arranged at the front of the vehicle, the chamfered portion is positioned forward while the projecting portion is positioned rearward.

For example, in a case where the vehicle seat 11 is applied to a front seat, a leg portion of a passenger seated on a rear seat may enter a lower area of the vehicle seat 11 (which is shown by an area A in FIG. 4). In such case, the leg portion of the passenger may touch or hit a portion of the load detection device 10 inwardly extending from the upper rail 16 (i.e., the chamfered portion and the projecting portion). At this time, however, the largely inclining chamfered portion is formed at the inwardly extending portion of the load detection device 10. Thus, even when the leg portion of the passenger seated on the rear seat enters the area A, the leg portion is prevented from hitting or touching the load detection device 10 provided at the rear end of the vehicle seat 11.

The projecting portion of the load detection device 10 corresponds to a connector portion of an amplifier case 80. That is, the connector portion of the amplifier case 80 in each of the load detection devices 10 provided at the rear end of vehicle seat 11 extends in a direction opposite from the passenger seated on the rear seat. Accordingly, the connector portion of the amplifier case 80 is prevented from being touched or hit by the leg portion of the passenger seated on the rear seat.

Next, a detailed structure of each of the load detection devices 10 will be explained with reference to FIGS. 5 and 6.

Figure 5:
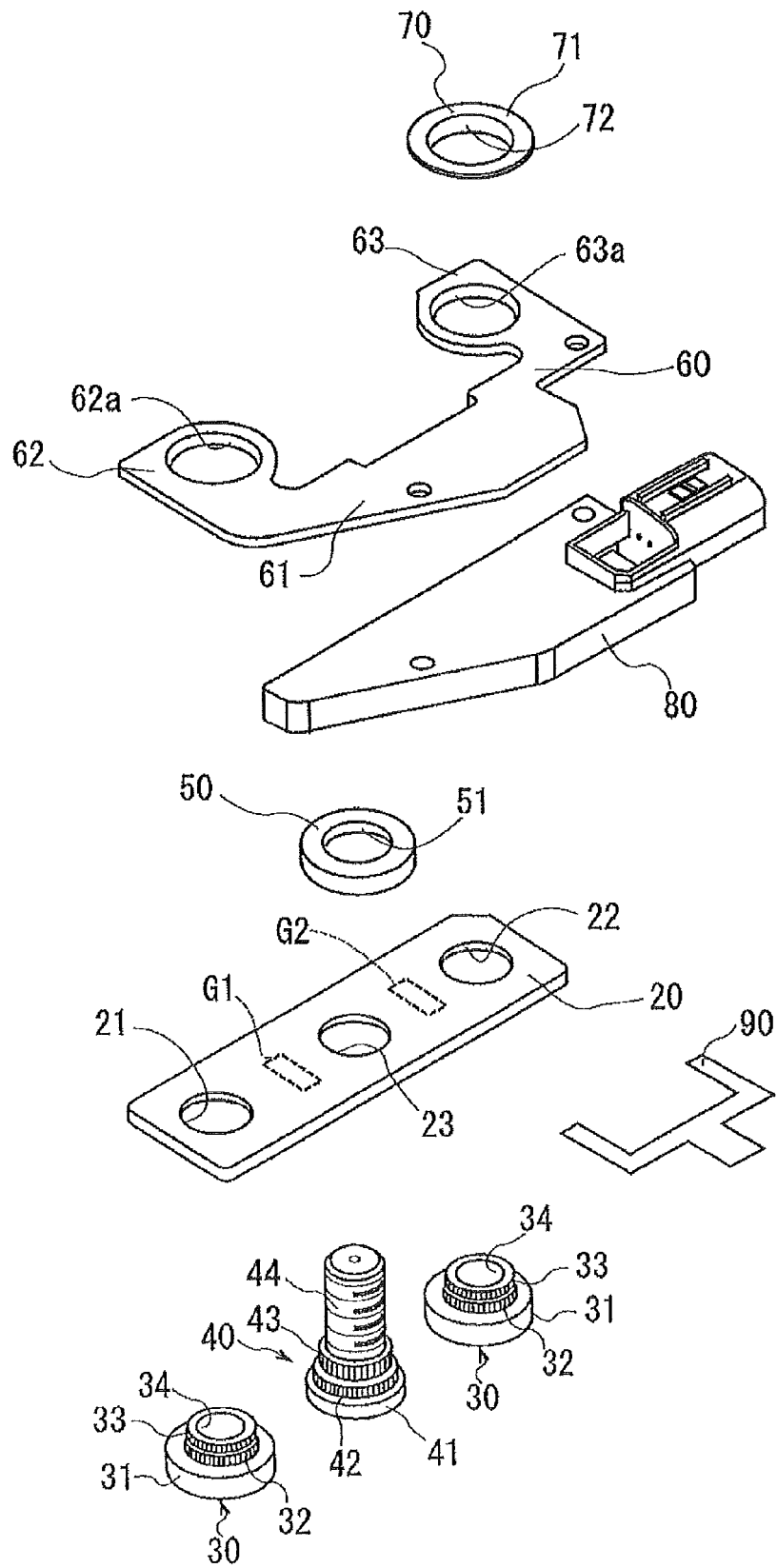
FIG. 5 is an exploded perspective view of the load detection device according to the first embodiment.
Figure 6:
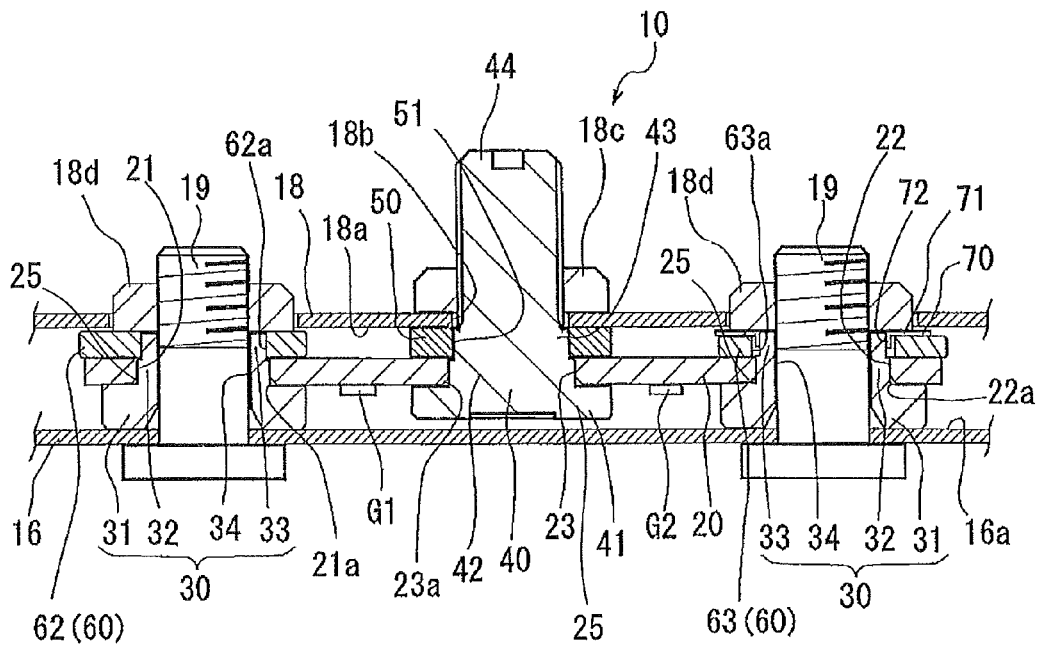
FIG. 6 is a cross-sectional view of the load detection device fixed to the upper rail and a seat frame portion according to the first embodiment.

As illustrated in FIGS. 5 and 6, the load detection device 10 includes a strain generating member 20, strain gauges G1, G2, first and second lower bushes 30, 30 each serving as a first shaft member, the connection shaft 40 serving as a second shaft member, a ring member 50, a bracket member 60, an upper bush 70, the amplifier case 80, and an FPC member 90.

The strain generating member 20 is formed into an elongated rectangular plate shape. For example, the strain generating member 20 is made of stainless steel on which a hardening process is performed. The strain generating member 20 has therefore an extremely high bending rigidity and a high surface hardness. First and second fixing holes 21 and 22, each having a circular shape and serving as a first hole, are formed at both ends of the strain generating member 20 in a longitudinal direction thereof. The first and second fixing holes 21 and 22 penetrate through a thickness direction of the strain generating member 20. A distance between the first and second fixing holes 21 and 22 is equal to a distance between the pair of fixed shafts 19 formed at each of the front end and the rear end of the upper rail 16. A center hole 23 having a circular shape, serving as a second hole, and penetrating through the thickness direction of the strain generating member 20 is also formed at a center between the fixing holes 21 and 22.

The first strain gauge G1 is attached to a portion between the first fixing hole 21 and the center hole 23 at a lower surface of the strain generating member 20. The second strain gauge G2 is attached to a portion between the second fixing hole 22 and the center hole 23 at the lower surface of the strain generating member 20. The first and second strain gauges G1 and G2 each include two elements constituting a half bridge. Then, the first and second strain gauges G1 and G2 constitute a full bridge by means of a wiring circuit within the amplifier case 80, a wiring formed at the FPC member 90, and the like. That is, the first and second strain gauges G1 and G2 measure deflection of the strain generating member 20. The deflection of the strain generating member 20 changes depending on the load of the passenger seated on the vehicle seat 11. The first and second strain gauges G1 and G2 thus measure the load of the passenger seated on the vehicle seat 11.

The first and second lower bushes 30, 30 are disposed between the strain generating member 20 and the upper rail 16 so as to form a clearance between the lower surface of the strain generating member 20 and the fitting surface 16a of the upper rail 16. The first and second lower bushes 30, 30 are formed by carbon steel, for example, so that a surface hardness of the first and second lower bushes 30, 30 is lower than that of the strain generating member 20. Each of the first and second lower bushes 30, 30 includes a base portion 31 serving as a head portion, a first press-fitted shaft portion 32 serving as a shaft body, and a second press-fitted shaft portion 33.

The base portion 31 is formed into a cylindrical shape having a predetermined thickness. An outer diameter of the base portion 31 is specified to be larger than an inner diameter of each of the first and second fixing holes 21 and 22 of the strain generating member 20. That is, the base portion 31 has the predetermined outer diameter so that the base portion 31 cannot be inserted into each of the fixing holes 21 and 22 of the strain generating member 20. The base portion 31 is sandwiched between the strain generating member 20 and the upper rail 16. Thus, the predetermined thickness of the base portion 31 corresponds to a clearance defined between the strain generating member 20 and the upper rail 16.

The first press-fitted shaft portion 32 is integrally formed at an upper surface of the base portion 31 so as to project therefrom. The first press-fitted shaft portion 32 is formed into a substantially cylindrical shape having a predetermined thickness. The first press-fitted shaft portion 32 is coaxially formed with the base portion 31. Serrations are formed at an outer periphery of the first press-fitted shaft portion 32. A circumscribed circle diameter of the first press-fitted shaft portion 32 is specified to be smaller than the outer diameter of the base portion 31. The predetermined thickness of the first press-fitted shaft portion 32 is substantially equal to or slightly smaller than a thickness of the strain generating member 20. The first press-fitted shaft portion 32 is press-fitted to each of the first and second fixing holes 21 and 22 of the strain generating member 20.

The second press-fitted shaft portion 33 is integrally formed at an upper surface of the first press-fitted shaft portion 32 so as to project therefrom. The second press-fitted shaft portion 33 is formed into a substantially cylindrical shape having a predetermined thickness. The second press-fitted shaft portion 33 is coaxially formed with the base portion 31 and the first press-fitted shaft portion 32. Serrations are formed at an outer periphery of the second press-fitted shaft portion 33. A circumscribed circle diameter of the second press-fitted shaft portion 33 is specified to be smaller than that of the first press-fitted shaft portion 32. The predetermined thickness of the second press-fitted shaft portion 33 is substantially equal to a thickness of the bracket member 60 which will be explained later. The second press-fitted shaft portion 33 is press-fitted to a first fitting hole 62a of the bracket member 60 or the upper bush 70.

Insertion holes 34 are formed at centers of the first and second lower bushes 30, 30, respectively, so as to penetrate therethrough. The fixed shafts 19 fixed at the upper rail 16 penetrate through the respective insertion holes 34. Thus, the first and second lower bushes 30, 30 are fixed to the strain generating member 20 by the penetration of the fixed shafts 19 into the insertion holes 34.

The connection shaft 40 is a member connecting the strain generating member 20 to the seat frame portion 18. The connection shaft 40 is formed by carbon steel, for example, so that a surface hardness of the connection shaft 40 is lower than that of the strain generating member 20. The connection shaft 40 includes a flange 41 serving as the head portion, a third press-fitted shaft portion 42 serving as the shaft body, a fourth press-fitted shaft portion 43, and a fixed screw portion 44.

The flange 41 is formed into a cylindrical shape having a predetermined thickness. An outer diameter of the flange 41 is specified to be larger than an inner diameter of the center hole 23 of the strain generating member 20. That is, the flange 41 has the predetermined outer diameter so that the flange 41 cannot be inserted into the center hole 23 of the strain generating member 20. The predetermined thickness of the flange 41 is specified to be smaller than that of the base portion 31 of each of the first and second lower bushes 30, 30. The flange 41 is arranged between the strain generating member 20 and the upper rail 16 while making contact or engaging with the lower surface of the strain generating member 20. That is, the flange 41 forms a clearance with the fitting surface 16a of the upper rail 16.

The third press-fitted shaft portion 42 is integrally formed at the flange 41 so as to project from an upper surface of the flange 41. The third press-fitted shaft portion 42 is formed into a substantially column shape having a predetermined thickness. The third press-fitted shaft portion 42 is coaxially formed with the flange 41. Serrations are formed at an outer periphery of the third press-fitted shaft portion 42. A circumscribed circle diameter of the third press-fitted shaft portion 42 is specified to be smaller than the outer diameter of the flange 41. The predetermined thickness of the third press-fitted shaft portion 42 is substantially equal to or slightly smaller than the thickness of the strain generating member 20. Then, the third press-fitted shaft portion 42 is press-fitted to the center hole 23 of the strain generating member 20.

The fourth press-fitted shaft portion 43 is integrally formed at the third press-fitted shaft portion 42 so as to project from an upper surface of the third press-fitted shaft portion 42. The fourth press-fitted shaft portion 43 is formed into a substantially column shape having a predetermined thickness. The fourth press-fitted shaft portion 43 is coaxially formed with the flange 41 and the third press-fitted shaft portion 42. Serrations are formed at an outer periphery of the fourth press-fitted shaft portion 43. A circumscribed circle diameter of the fourth press-fitted shaft portion 43 is specified to be smaller than that of the third press-fitted shaft portion 42. The predetermined thickness of the fourth press-fitted shaft portion 43 is substantially equal to a thickness of the ring member 50 which will be explained later. Then, the fourth press-fitted shaft portion 43 is press-fitted to a through-hole 51 formed at the ring member 50.

The fixed screw portion 44 is integrally formed at the fourth press-fitted shaft portion 43 so as to project from an upper surface of the fourth press-fitted shaft portion 43. The fixed screw portion 44 is coaxially formed with the fourth press-fitted shaft portion 43. An outer diameter of the fixed screw portion 44 is smaller than the circumscribed circle diameter of the fourth press-fitted shaft portion 43 and is smaller than the connection hole 18b of the seat frame portion 18. The fixed screw portion 44 is inserted into the through-hole 51 of the ring member 50 and the connection hole 18b of the seat frame portion 18, and then is tightened by means of a nut 18c.

The ring member 50 is formed into a cylindrical shape having a predetermined thickness. An inner diameter of the through-hole 51 of the ring member 50 is specified to be slightly smaller than the circumscribed circle diameter of the fourth press-fitted shaft portion 43 of the connection shaft 40. The ring member 50 is provided on an upper surface of the strain generating member 20, being coaxial with the center hole 23 of the strain generating member 20. In such state, after the fixed screw portion 44 is inserted into the through-hole 51 of the ring member 50, the fourth press-fitted shaft portion 43 of the connection shaft 40 is press-fitted to the through-hole 51 from a lower side. At this time, the surface hardness of the connection shaft 40 is specified to be lower than that of the ring member 50. Thus, in a case where the fourth press-fitted shaft portion 43 is press-fitted to the through-hole 51 of the ring member 50, projecting portions of the serrations of the fourth press-fitted shaft portion 43 are crushed and deformed, or are scraped off. Accordingly, the fourth press-fitted shaft portion 43 of the connection shaft 40 is press-fitted to the ring member 50.

Further, the ring member 50 is provided on a lower surface of the seat frame portion 18, being coaxial with the connection hole 18b of the seat frame portion 18. That is, the ring member 50 is sandwiched between the strain generating member 20 and the seat frame portion 18 so that a clearance is formed between the upper surface of the strain generating member 20 and the fitting surface 18a of the seat frame portion 18. The fixed screw portion 44 of the connection shaft 40 is meshed with the nut 18c so that the strain generating member 20 and the seat frame portion 18 are fixed, having a predetermined distance therebetween, by means of the ring member 50.

The bracket member 60 is formed into a flat plate shape by a steel plate. The bracket member 60 is provided for fixing the amplifier case 80 to the strain generating member 20. The bracket member 60 includes an amplifier case attachment portion 61, first and second engagement portions 62 and 63.

The amplifier case 80, which will be explained later, is mounted on the amplifier case attachment portion 61. The amplifier case attachment portion 61 has a substantially elongated right triangular shape. That is, one corner of the amplifier case attachment portion 61 is chamfered so as to greatly incline. The amplifier case attachment portion 61 corresponds to the inwardly extending portion of the load detection device 10 that has been explained with reference to FIG. 4.

The first engagement portion 62 is integrally formed at the amplifier case attachment portion 61 so as to project from a surface, where the chamfer is not formed, at a most acute portion of the right triangle of the amplifier case attachment portion 61 (left rear side in FIG. 5). A circular-shaped first fitting hole 62a is formed at the first engagement portion 62. The first engagement portion 62 is arranged on the upper surface of the strain generating member 20 so that the first fitting hole 62a is coaxial with the first fixing hole 21. The second press-fitted shaft portion 33 of the first lower bush 30 is press-fitted to the first fitting hole 62a. Thus, an inner diameter of the first fitting hole 62a is specified to be smaller than a circumscribed circle diameter of the second press-fitted shaft portion 33. Further, the fixed shaft 19 is inserted into the first lower bush 30 from a lower side and a nut 18d is meshed with the fixed shaft 19 in a state where the nut 18d is in contact with an upper surface of the first engagement portion 62. As a result, the first lower bush 30, the strain generating member 20, and the first engagement portion 62 of the bracket member 60 are fixed to the upper rail 16.

The second engagement portion 63 is integrally formed at the amplifier case attachment portion 61 so as to project from a surface coplanar with the surface, where the first engagement portion 62 is formed in a projecting manner, at a bottom portion (base) of the right triangle of the amplifier case attachment portion 61 (right rear side in FIG. 5). The second engagement portion 63 is arranged so as to have a predetermined distance from the first engagement portion 62. A circular-shaped second fitting hole 63a is formed at the second engagement portion 63. An inner diameter of the second fitting hole 63a is specified to be larger than the circumscribed circular diameter of the second press-fitted shaft portion 33. Thus, the second press-fitted shaft portion 33 is prevented from being press-fitted to the second fitting hole 63a. That is, the second press-fitted shaft portion 33 is inserted into the second fitting hole 63a in a state where a clearance is formed between the second press-fitted shaft portion 33 and the second fitting hole 63a. The second engagement portion 63 is arranged on the upper surface of the strain generating member 20 in such a manner that the second fitting hole 63a and the second fixing hole 22 are substantially coaxial with each other.

At this time, the upper bush 70 is arranged on an upper surface of the second engagement portion 63. The upper bush 70, which is formed into a ring shape, includes a flat seat portion 71 having a hollow disc shape, and a cylindrical portion 72 axially projecting from an inner peripheral edge of the flat seat portion 71. The flat seat portion 71 is arranged on an upper surface of the second engagement portion 63 in an overlapping manner. The cylindrical portion 72 is inserted into the second fitting hole 63a of the second engagement portion 63. A clearance is formed between an outer peripheral surface of the cylindrical portion 72 and an inner peripheral surface of the second fitting hole 63a. An inner diameter of the cylindrical portion 72 is specified to be smaller than the circumscribed circle diameter of the second press-fitted shaft portion 33 of the second lower bush 30. That is, the second press-fitted shaft portion 33 of the second lower bush 30 is press-fitted to the cylindrical portion 72.

The fixed shaft 19 is inserted into the second lower bush 30 from a lower side and the nut 18d is meshed with the fixed shaft 19 in a state where the nut 18d is in contact with an upper surface of the upper bush 70. As a result, the second lower bush 30, the strain generating member 20, the second engagement portion 63 of the bracket member 60, and the upper bush 70 are fixed to the upper rail 16.

The first engagement portion 62 and the second engagement portion 63 are arranged, having the predetermined distance therebetween. The ring member 50 is arranged at an area defined between the first engagement portion 62 and the second engagement portion 63.

The amplifier case 80 is made of resin such as a PBT (Polybutylene terephthalate). The amplifier case 80 includes a circuit board within which an amplifier circuit is constituted. The amplifier case 80 is formed into an elongated rectangular shape of which one corner is chamfered (front side in FIG. 5), greatly inclining, so as to match the shape of the amplifier case attachment portion 61 of the bracket member 60. A connector is provided to project from a portion of the amplifier case 80 opposite from the chamfered portion. The amplifier case 80 is fixed to a lower surface of the amplifier case attachment portion 61 so that the chamfered portions of the amplifier case 80 and the amplifier case attachment portion 61 match each other. The amplifier circuit within the amplifier case 80 communicates with an electronic control unit via the connector.

The FPC member 90 is made of an FPC (flexible printed circuit) board, having a substantially U-shape as illustrated in FIG. 5. Both ends of an opening side of the U-shape of the FPC member 90 are connected to the strain gauges G1 and G2, respectively. A center portion of the U-shape of the FPC member 90 is connected to the amplifier circuit within the amplifier case 80.

Figure 7A:
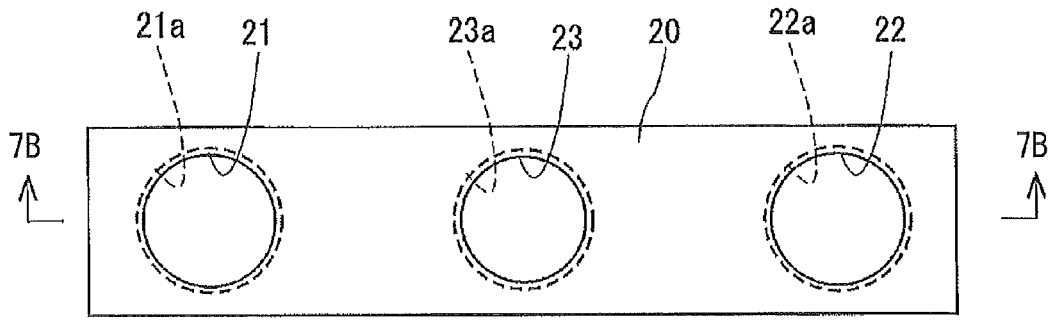
FIG. 7A is a plan view of a strain generating member according to the first embodiment.
Figure 7B:
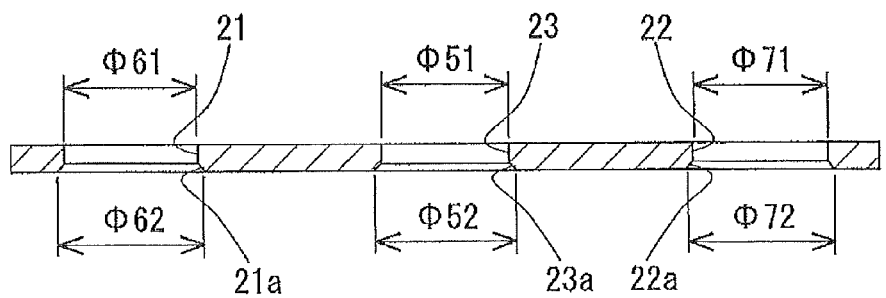
FIG. 7B is a cross-sectional view taken along line 7B-7B in FIG. 7A.

Next, detailed structures of the strain generating member 20, the lower bush 30 and the connection shaft 40 will be explained with reference to FIGS. 7 to 9.

As mentioned above, the strain generating member 20 is formed into the elongated rectangular plate shape and is made of stainless steel on which the hardening process is performed. As illustrated in FIG. 7, first, second and third tapered portions 21a, 22a, and 23a are formed at the first and second fixing holes 21, 22, and the center hole 23 of the strain generating member 20, respectively. Specifically, each of the first, second, and third tapered portions 21a, 22a, and 23a serving as a relief portion is formed at one axial end of an opening of each of the first and second fixing holes 21, 22, and the center hole 23. The one axial end of the opening of each of the holes 21, 22, and 23, where each of the first to third tapered portions 21a, 22a, and 23a are formed, is positioned at a lower side in FIG. 6.

An inner diameter of the first fixing hole 21 is Φ61 while an expanded diameter (i.e., a maximum diameter) of the first tapered portion 21a is Φ62, which is greater than the inner diameter Φ61 of the first fixing hole 21. An inner diameter of the second fixing hole 22 is Φ71 while an expanded diameter (i.e., a maximum diameter) of the second tapered portion 22a is Φ72, which is greater than the inner diameter Φ71 of the second fixing hole 22. An inner diameter of the center hole 23 is Φ51 while an expanded diameter (i.e., a maximum diameter) of the third tapered portion 23a is Φ52, which is greater than the inner diameter Φ51 of the center hole 23.

As mentioned above, the lower bush 30 is made of carbon steel, for example, so that the surface hardness of the lower bush 30 is specified to be lower than that of the strain generating member 20. The lower bush 30 includes the base portion 31 serving as the head portion, the first press-fitted shaft portion 32 serving as the shaft body, and the second press-fitted shaft portion 33.

Specifically, as illustrated in FIG. 8A, an upper surface of the base portion 31 is formed into a flat shape. In addition, as illustrated in FIGS. 8B and 8C, the serrations are formed at an entire periphery of each of the first and second press-fitted shaft portions 32 and 33.

As illustrated in FIG. 8B, the first press-fitted shaft portion 32 includes a shaft center portion 32a serving as a non-press-fitted portion, and projecting portions 32b each serving as a scraping projecting portion. The shaft center portion 32a is formed into a column shape having an outer diameter φ32. The outer diameter φ32 of the shaft center portion 32a is specified to be smaller than the inner diameters Φ61 and Φ71 of the first and second fixing holes 21 and 22 of the strain generating member 20. The projecting portions 32b are formed by the serrations over an entire outer periphery of the shaft center portion 32a in a circumferential direction thereof, i.e., by multiple protrusions each of which extends along the axial direction of the first press-fitted shaft portion 32. That is, the projecting portions 32b are formed to extend from one axial end to the other axial end of the first press-fitted shaft portion 32. Further, each of the projecting portions 32b is formed in such a manner to be gradually narrower towards an axial end. A circumscribed circle diameter φ31 of the projecting portions 32b is specified to be larger than the inner diameters Φ61 and Φ71 of the first and second fixing holes 21 and 22 of the strain generating member 20. On the other hand, the circumscribed circle diameter φ31 of the projecting portions 32b is specified to be smaller than the expanded diameters Φ62 and Φ72 of the first and second tapered portions 21a and 22a.

Further, the surface hardness of the projecting portions 32b is specified to be lower than that of the first and second fixing holes 21 and 22 of the strain generating member 20. Thus, in a case where the first press-fitted shaft portion 32 is inserted into each of the first and second fixing holes 21 and 22, at least a portion of the projecting portions 32b is scraped off by each of the first and second fixing holes 21 and 22. In addition, the outer peripheral surface of the shaft center portion 32a, i.e., portions corresponding to grooves of the projecting portions 32b, are arranged adjacent to the projecting portions 32b in a peripheral direction of the first press-fitted shaft portion 32. When the first press-fitted shaft portion 32 is inserted into each of the first and second fixing holes 21 and 22 of the strain generating member 20, a pressure is prevented from being mutually applied between the shaft center portion 32a and each of the first and second fixing holes 21 and 22.

As mentioned above, the first press-fitted shaft portion 32 is press-fitted to each of the first and second fixing holes 21 and 22 while the projecting portions 32b are scraped off. Thus, no pressing force is applied to the first press-fitted shaft portion 32. When the first press-fitted shaft portion 32 is press-fitted to each of the first and second fixing holes 21 and 22 of the strain generating member 20, an internal stress is restrained from being generated at the strain generating member 20 by means of the press-fitting of the first press-fitted shaft portion 32.

Further, one of the multiple projecting portions 32b is formed at a position symmetrical about an axis of the first press-fitted shaft portion 32 relative to the other one of the multiple projecting portions 32b. That is, the circumscribed circle diameter of the multiple projecting portions 32b corresponds to a distance defined between tip ends of the pair of projecting portions 32b arranged so as to face each other. Accordingly, the circumscribed circle diameter of the multiple projecting portions 32b is securely and easily measured by means of the two projecting portions 32b facing each other. In addition, the axially perpendicular cross section of each of the first and second fixing holes 21 and 22 of the strain generating member 20 is formed into a circular shape. That is, the distance between the tip ends of the facing two projecting portions 32b is desirably specified to be larger than the inner diameter of each of the first and second fixing holes 21 and 22 of the strain generating member 20, thereby allowing a highly accurate amount of scrapings of the projecting portions 32b.

Each of the tapered portions 21a and 22a is formed at the one axial end of the opening of each of the first and second fixing holes 21 and 22 of the strain generating member 20. In addition, the upper surface of the base portion 31 is formed into a flat shape. Thus, a relief interspace 25 serving as an inter space is formed by the upper surface of the base portion 31, a base portion of the first press-fitted shaft portion 32, and each of the tapered portions 21a and 22a. The relief interspace 25 is provided for accommodating scrapings of the projecting portions 3, which is caused by each of the first and second fixing holes 21 and 22. That is, the scrapings of the projecting portions 32b are received in the relief interspace 25 that is formed in a state where the upper surface of the base portion 31 engages with the lower surface of the strain generating member 20. Specifically, each of the tapered portions 21a and 22a, i.e., each of the relief interspaces 25, is formed at entire periphery of the one axial end of the opening of each of the fixing holes 21 and 22.

Because the scrapings of the projecting portions 32b are received within the relief interspace 25, the scrapings are prevented from interfering between the projecting portions 32b and each of the fixing holes 21 and 22 of the strain generating member 20. That is, the scrapings of the projecting portions 32b are prevented from inducing the internal stress within the strain generating member 20. As a result, the strain detection accuracy of the strain gauges G1 and G2 is enhanced. That is, the load detection accuracy of the load detection device 10 when the passenger is seated on the vehicle seat 11 is improved.

The tapered portions 21a and 22a where the relief interspaces 25 are formed are molded at the same time as when the fixing holes 21 and 22 are formed by punching. That is, the tapered portions 21a and 22a are easily molded without a separate process, which leads to a reduced cost.

Further, the outer diameter $\phi 32$ of the shaft center portion 32a serving as the non-press-fitted portion is specified to be smaller than the inner diameters $\Phi 61$ and $\Phi 71$ of the fixing holes 21 and 22. Thus, after the first press-fitted shaft portion 32 is press-fitted to each of the fixing holes 21 and 22, a clearance is formed between the shaft center portion 32a and an inner peripheral surface of each of the fixing holes 21 and 22. Accordingly, in addition to the relief interspace 25, the clearance formed between the shaft center portion 32a and each of the fixing holes 21 and 22 functions as an inter space for accommodating the scrapings of the projecting portions 32b. The scrapings of the projecting portions 32b are securely prevented from inducing the internal stress within the strain generating member 20.

However, a spatial volume of the clearance formed between the shaft center portion 32a and the inner peripheral surface of each of the fixing holes 21 and 22 is specified to be smaller than a volume of scrapings of the projecting portions 32b. Because the relief interspace 25 is formed, the scrapings of the projecting portions 32b are not necessarily fully accommodated in the interspace between the shaft center portion 32a and each of the fixing holes 21 and 22. That is, according to the present embodiment, the clearance formed between the shaft center portion 32a and the inner peripheral surface of each of the fixing holes 21 and 22 is not necessarily enlarged too much. As a result, the bending rigidity of the first press-fitted shaft portion 32 is enhanced, which results in an improved support stiffness of the strain generating member 20 by the first press-fitted shaft portion 32.

In addition, the expanded diameters (maximum inner diameters) $\Phi 62$ and $\Phi 72$ of the tapered portions 21a and 22a are specified to be larger than the circumscribed circle diameter $\phi 31$ of the projecting portions 32b. Thus, in an early stage where the first press-fitted shaft portion 32 is press-fitted to each of the fixing holes 21 and 22 of the strain generating member 20, the positioning of each of the lower bushes 30, 30 relative to each of the fixing holes 21 and 22 is easily performed. As a result, the multiple projecting portions 32b are uniformly scraped off, which enables a centering of the lower bush 30 relative to each of the fixing holes 21 and 22 of the strain generating member 20.

As mentioned above, the multiple projecting portions 32b extend along the axial direction of the first press-fitted shaft portion 32. Thus, the projecting portions 32b are press-fitted to each of the fixing holes 21 and 22 of the strain generating member 20 while being sequentially scraped off. The centering and positioning of the lower bush 30 relative to the strain generating member 20 are further securely performed accordingly.

The second press-fitted shaft portion 33 has a similar shape to that of the first press-fitted shaft portion 32 but differs in a diameter which is slightly smaller than that of the first press-fitted shaft portion 32. A relationship between the second press-fitted shaft portion 33 and the first fitting hole 62a of the bracket member 60 or the upper bush 70 is substantially the same as the aforementioned relationship between the first press-fitted shaft portion 32 and each of the fixing holes 21 and 22. Specifically, as illustrated in FIG. 8C, the second press-fitted shaft portion 33 includes a shaft center portion 33a serving as the non-press-fitted portion and projecting portions 33b each serving as the scraping projecting portion. An outer diameter (groove diameter) $\phi 42$ of the shaft center portion 33a is smaller than the first fitting hole 62a of the bracket member 60 and an inner diameter of the upper bush 70. A circumscribed circle diameter $\phi 41$ of the projecting portions 33b is specified to be larger than the first fitting hole 62a of the bracket member 60 and the inner diameter of the upper bush 70. An effect caused by such structure is substantially the same as that obtained by the first press-fitted shaft portion 32.

Details of the connection shaft 40 will be explained below. The connection shaft 40 made of carbon steel, for example, includes the flange 41 serving as the head portion and engaging with the strain generating member 20, the third press-fitted shaft portion 42 serving as the shaft body and being press-fitted to the center hole 23 of the strain generating member 20, the fourth press-fitted shaft portion 43 press-fitted to the ring member 50, and the fixed screw portion 44. As illustrated in FIG. 9A, an upper surface of the flange 41 is formed into a flat shape. As illustrated in FIGS. 9B and 9C, the serrations are formed at an entire outer periphery of each of the third and fourth press-fitted shaft portions 42 and 43.

The third press-fitted shaft portion 42 includes a shaft center portion 42a serving as the non-press-fitted portion, and projecting portions 42b each serving as the scraping projecting portion. The shaft center portion 42a is formed into a column shape having an outer diameter $\phi 12$. The outer diameter $\phi 12$ of the shaft center portion 42a is specified to be smaller than the inner diameter $\Phi 51$ of the center hole 23. The projecting portions 42b are formed by the serrations over an entire outer periphery of the shaft center portion 42a, i.e., by multiple projections each of which extends along the axial direction of the third press-fitted shaft portion 42. That is, the projecting portions 42b are formed to extend from one axial end to the other axial end of the third press-fitted shaft portion 42. Further, each of the projecting portions 42b is formed to be gradually narrower towards an axial end. A circumscribed circle diameter $\phi 11$ of the projecting portions 42b is specified to be larger than the inner diameter $\Phi 51$ of the center hole 23 of the strain generating member 20. Further, the circumscribed circle diameter $\phi 11$ of the projecting portions 42b is specified to be smaller than the extended diameter $\Phi 52$ of the tapered portion 23a. One of the multiple projecting portions 42b is formed at a position symmetrical about an axis of the third press-fitted shaft portion 42 relative to the other one of the multiple projecting portions 42b.

Further, the surface hardness of the projecting portions 42b is specified to be lower than that of the center hole 23 of the strain generating member 20. Thus, in a case where the third press-fitted shaft portion 42 is inserted into the center hole 23, at least a portion of the projecting portions 42b is scraped off by the center hole 23. In addition, the outer peripheral surface of the shaft center portion 42a, i.e., grooves of the projecting portions 42b, are arranged adjacent to the projecting portions 42b in a peripheral direction of the third press-fitted shaft portion 42. When the third press-fitted shaft portion 42 is inserted into the center hole 23 of the strain generating member 20, a pressure is prevented from being mutually applied between the shaft center portion 42a and the center hole 33.

Accordingly, the relationship between the connection shaft 40 and the center hole 23 of the strain generating member 20 is substantially equal to the aforementioned relationship between the lower bush 30 and each of the fixing holes 21 and 22. In a case where the third press-fitted shaft portion 42 of the connection shaft 40 is press-fitted to the center hole 23 of the strain generating member 20, the same effect is obtained as that obtained when the first press-fitted shaft portion 32 of the lower bush 30 is press-fitted to each of the fixing holes 21 and 22 of the strain generating member 20.

The fourth press-fitted shaft portion 43 has a similar shape to that of the third press-fitted shaft portion 42 but differs in a diameter which is slightly smaller than that of the third press-fitted shaft portion 42. A relationship between the fourth press-fitted shaft portion 43 and the through-hole 51 of the ring member 50 is substantially the same as the aforementioned relationship between the third press-fitted shaft portion 42 and the center hole 23 of the strain generating member 20. Specifically, as illustrated in FIG. 9C, the fourth press-fitted shaft portion 43 includes a shaft center portion 43a serving as the non-press-fitted portion and projecting portions 43b each serving as the scraping projecting portion. An outer diameter (groove diameter) $\phi 22$ of the shaft center portion 43a is smaller than the inner diameter of the through-hole 51 of the ring member 50. A circumscribed circle diameter $\phi 21$ of the projecting portions 43b is specified to be larger than the inner diameter of the through-hole 51 of the ring member 50. An effect caused by such structure is substantially the same as that obtained by the third press-fitted shaft portion 42.

Accordingly, even when the first and second lower bushes 30, 30, and the connection shaft 40 are all press-fitted to the strain generating member 20, the generation of the internal pressure within the strain generating member 20 is securely prevented. That is, the strain detection accuracy of the strain gauges G1 and G2 is further improved. As a result, the load detection accuracy of the load detection device 10 when the passenger is seated on the vehicle seat 11 is further enhanced.

[Modification of First Embodiment]

According to the aforementioned embodiment, the outer diameter $\phi 32$ of the shaft center portion 32a of the first press-fitted shaft portion 32 of the lower bush 30 is specified to be smaller than the inner diameters $\Phi 61$ and $\Phi 71$ of the fixing holes 21 and 22 of the strain generating member 20. Alternatively, the outer diameter $\phi 32$ of the shaft center portion 32a and the inner diameters $\Phi 61$ and $\Phi 71$ of the fixing holes 21 and 22 may be equal to each other. However, the shaft center portion 32a is necessarily prevented from being press-fitted to each of the fixing holes 21 and 22. At this time, the outer peripheral surface of the shaft center portion 32a makes contact with, instead of being press-fitted to, the inner peripheral surface of each of the fixing holes 21 and 22 of the strain generating member 20. That is, a contact area between the first press-fitted shaft portion 32 and each of the fixing holes 21 and 22 of the strain generating member 20 increases. Thus, the support stiffness of the strain generating member 20 by the first press-fitted shaft portion 32 is enhanced. At this time, however, because no clearance is formed between the outer peripheral surface of the shaft center portion 32a and the inner peripheral surface of each of the fixing holes 21 and 22 of the strain generating member 20, the function of the interspace accommodating the scrapings of the projecting portions 32b is not achieved.

In addition, the connection shaft 40 may be modified in the same way as the lower bush 30 as mentioned above. In this case, the same effect as that obtained by the modified lower bush 30 may be obtained.

[Second Embodiment]

A detailed structure of the load detection device 10 according to a second embodiment will be explained with reference to FIGS. 10 and 11.

Figure 11:
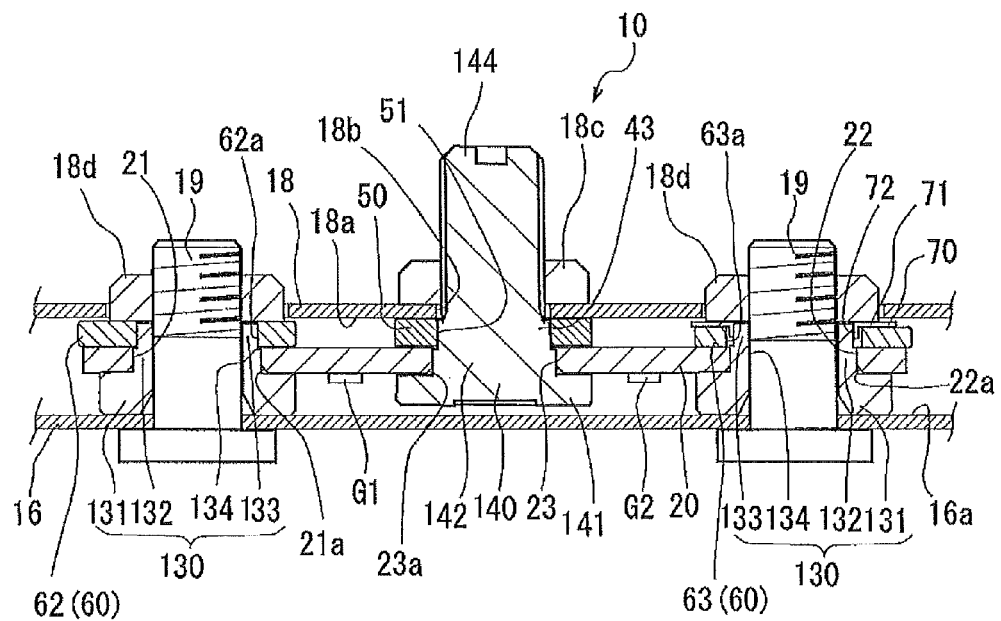
FIG. 11 is a cross-sectional view of the load detection device fixed to the upper rail and the seat frame portion according to the second embodiment.

As illustrated in FIGS. 10 and 11, the load detection device 10 includes the strain generating member 20, the strain gauges G1, G2, first and second lower bushes 130, 130 each serving as the first shaft member, a connection shaft 140 serving as the second shaft member, the ring member 50, the bracket member 60, the upper bush 70, the amplifier case 80, and the FPC member 90.

The strain generating member 20 is formed into an elongated rectangular plate shape. For example, the strain generating member 20 is made of stainless steel on which a hardening process is performed. The strain generating member 20 has therefore an extremely high bending rigidity and a high surface hardness. The first and second fixing holes 21 and 22, each having a circular shape, are formed at both ends of the strain generating member 20 in a longitudinal direction thereof. The first and second fixing holes 21 and 22 penetrate through a thickness direction of the strain generating member 20. A distance between the first and second fixing holes 21 and 22 is equal to a distance between the pair of fixed shafts 19 formed at each of the front end and the rear end of the upper rail 16. The center hole 23 having a circular shape and penetrating through the thickness direction of the strain generating member 20 is also formed at a center between the fixing holes 21 and 22.

The first strain gauge G1 is attached to a portion between the first fixing hole 21 and the center hole 23 at a lower surface of the strain generating member 20. The second strain gauge G2 is attached to a portion between the second fixing hole 22 and the center hole 23 at the lower surface of the strain generating member 20. The first and second strain gauges G1 and G2 each include two elements constituting a half bridge. Then, the first and second strain gauges G1 and G2 constitute a full bridge by means of a wiring circuit within the amplifier case 80, a wiring formed at the FPC member 90, and the like. That is, the first and second strain gauges G1 and G2 measure deflection of the strain generating member 20. The deflection of the strain generating member 20 changes depending on the load of the passenger seated on the vehicle seat 11. The first and second strain gauges G1 and G2 thus measure the load of the passenger seated on the vehicle seat 11.

The first and second lower bushes 130, 130 are disposed between the strain generating member 20 and the upper rail 16 so as to form a clearance between the lower surface of the strain generating member 20 and the fitting surface 16*a* of the upper rail 16. The first and second lower bushes 130, 130 are formed by carbon steel, for example, so that a surface hardness of the first and second lower bushes 130, 130 is lower than that of the strain generating member 20. Each of the first and second lower bushes 130, 130 includes a base portion 131 serving as the head portion, a first press-fitted shaft portion 132 serving as the shaft body, and a second press-fitted shaft portion 133.

The base portion 131 is formed into a cylindrical shape having a predetermined thickness. An outer diameter of the base portion 131 is specified to be larger than an inner diameter of each of the first and second fixing holes 21 and 22 of the strain generating member 20. That is, the base portion 131 has the predetermined outer diameter so that the base portion 131 cannot be inserted into each of the fixing holes 21 and 22 of the strain generating member 20. The base portion 131 is sandwiched between the strain generating member 20 and the upper rail 16. Thus, the predetermined thickness of the base portion 131 corresponds to a clearance defined between the strain generating member 20 and the upper rail 16.

The first press-fitted shaft portion 132 is integrally formed at an upper surface of the base portion 131 so as to project therefrom. The first press-fitted shaft portion 132 is formed into a substantially cylindrical shape having a predetermined thickness. The first press-fitted shaft portion 132 is coaxially formed with the base portion 131. An axially perpendicular cross section of an outer peripheral surface of the first press-fitted shaft portion 132 is formed into a regular hexagonal shape. A circumscribed circle diameter of the first press-fitted shaft portion 132 is specified to be smaller than the outer diameter of the base portion 131. The predetermined thickness of the first press-fitted shaft portion 132 is substantially equal to or slightly smaller than the thickness of the strain generating member 20. The first press-fitted shaft portion 132 is press-fitted to each of the first and second fixing holes 21 and 22 of the strain generating member 20.

The second press-fitted shaft portion 133 is integrally formed at an upper surface of the first press-fitted shaft portion 132 so as to project therefrom. The second press-fitted shaft portion 133 is formed into a substantially cylindrical shape having a predetermined thickness. The second press-fitted shaft portion 133 is coaxially formed with the base portion 131 and the first press-fitted shaft portion 132. An axially perpendicular cross section of an outer peripheral surface of the second press-fitted shaft portion 133 is formed into a regular hexagonal shape. A circumscribed circle diameter of the second press-fitted shaft portion 133 is specified to be smaller than that of the first press-fitted shaft portion 132. The predetermined thickness of the second press-fitted shaft portion 133 is substantially equal to the thickness of the bracket member 60. The second press-fitted shaft portion 133 is press-fitted to the first fitting hole 62*a* of the bracket member 60 and the upper bush 70.

Insertion holes 134 are formed at centers of the first and second lower bushes 130, 130, respectively, so as to penetrate therethrough. The fixed shafts 19 fixed at the upper rail 16 penetrate through the respective insertion holes 134. Thus, the first and second lower bushes 130, 130 are fixed to the strain generating member 20 by the penetration of the fixed shafts 19 into the insertion holes 134.

The connection shaft 140 is a member connecting the strain generating member 20 to the seat frame portion 18. The connection shaft 140 is formed by carbon steel, for example, so that a surface hardness of the connection shaft 140 is lower than that of the strain generating member 20. The connection shaft 140 includes a flange 141 serving as the head portion, a third press-fitted shaft portion 142 serving as the shaft body, a fourth press-fitted shaft portion 143, and a fixed screw portion 144.

The flange 141 is formed into a cylindrical shape having a predetermined thickness. An outer diameter of the flange 141 is specified to be larger than an inner diameter of the center hole 23 of the strain generating member 20. That is, the flange 141 has the predetermined outer diameter so that the flange 141 cannot be inserted into the center hole 23 of the strain generating member 20. The predetermined thickness of the flange 141 is specified to be smaller than that of the base portion 131 of each of the first and second lower bushes 130, 130. The flange 141 is arranged between the strain generating member 20 and the upper rail 16 while making contact or engaging with the lower surface of the strain generating member 20. That is, the flange 141 forms a clearance with the fitting surface 16*a* of the upper rail 16.

The third press-fitted shaft portion 142 is integrally formed at the flange 141 so as to project from an upper surface of the flange 141. The third press-fitted shaft portion 142 is formed into a substantially prismatic column shape having a predetermined thickness. The third press-fitted shaft portion 142 is coaxially formed with the flange 141. An axially perpendicular cross section of an outer peripheral surface of the third press-fitted shaft portion 142 is formed into a regular hexagonal shape. A circumscribed circle diameter of the third press-fitted shaft portion 142 is specified to be smaller than the outer diameter of the flange 141. The predetermined thickness of the third press-fitted shaft portion 142 is substantially equal to or slightly smaller than the thickness of the strain generating member 20. Then, the third press-fitted shaft portion 142 is press-fitted to the center hole 23 of the strain generating member 20.

The fourth press-fitted shaft portion 143 is integrally formed at the third press-fitted shaft portion 142 so as to project from an upper surface of the third press-fitted shaft portion 142. The fourth press-fitted shaft portion 143 is formed into a substantially prismatic column shape having a predetermined thickness. The fourth press-fitted shaft portion 143 is coaxially formed with the flange 141 and the third press-fitted shaft portion 142. An axially perpendicular cross section of an outer peripheral surface of the fourth press-fitted shaft portion 143 is formed into a regular hexagonal shape. A circumscribed circle diameter of the fourth press-fitted shaft portion 143 is specified to be smaller than that of the third press-fitted shaft portion 142. The predetermined thickness of the fourth press-fitted shaft portion 143 is substantially equal to the thickness of the ring member 50 which will be explained later. Then, the fourth press-fitted shaft portion 143 is press-fitted to the through-hole 51 formed at the ring member 50.

The fixed screw portion 144 is integrally formed at the fourth press-fitted shaft portion 143 so as to project from an upper surface of the fourth press-fitted shaft portion 143. The fixed screw portion 144 is coaxially formed with the fourth press-fitted shaft portion 143. An outer diameter of the fixed screw portion 144 is smaller than the circumscribed circle diameter of the fourth press-fitted shaft portion 143 and is smaller than the connection hole 18*b* of the seat frame portion 18. The fixed screw portion 144 is inserted into the through-hole 51 of the ring member 50 and the connection hole 18b of the seat frame portion 18, and then is tightened by means of the nut 18c.

The ring member 50 is formed into a cylindrical shape having a predetermined thickness. An inner diameter of the through-hole 51 of the ring member 50 is specified to be slightly smaller than the circumscribed circle diameter of the fourth press-fitted shaft portion 143 of the connection shaft 140. The ring member 50 is provided on an upper surface of the strain generating member 20, being coaxial with the center hole 23 of the strain generating member 20. In such state, after the fixed screw portion 144 is inserted into the through-hole 51 of the ring member 50, the fourth press-fitted shaft portion 143 of the connection shaft 140 is press-fitted to the through-hole 51 from a lower side. At this time, the surface hardness of the connection shaft 140 is specified to be lower than that of the ring member 50. Thus, in a case where the fourth press-fitted shaft portion 143 is press-fitted to the through-hole 51 of the ring member 50, corner portions (projecting portions) on the outer peripheral surface of the fourth press-fitted shaft portion 143 are crushed and deformed, or are scraped off. Accordingly, the fourth press-fitted shaft portion 143 of the connection shaft 140 is press-fitted to the ring member 50.

Further, the ring member 50 is provided on a lower surface of the seat frame portion 18, being coaxial with the connection hole 18b of the seat frame portion 18. That is, the ring member 50 is sandwiched between the strain generating member 20 and the seat frame portion 18 so that a clearance is formed between the upper surface of the strain generating member 20 and the fitting surface 18a of the seat frame portion 18. The fixed screw portion 144 of the connection shaft 140 is meshed with the nut 18c so that the strain generating member 20 and the seat frame portion 18 are fixed, having a predetermined distance therebetween, by means of the ring member 50.

The bracket member 60 is formed into a flat plate shape by a steel plate. The bracket member 60 is provided for fixing the amplifier case 80 to the strain generating member 20. The bracket member 60 includes the amplifier case attachment portion 61, the first and second engagement portions 62 and 63. The amplifier case 80, which will be explained later, is mounted on the amplifier case attachment portion 61. The amplifier case attachment portion 61 has a substantially elongated right triangular shape. That is, one corner of the amplifier case attachment portion 61 is chamfered so as to greatly incline. The amplifier case attachment portion 61 corresponds to the inwardly extending portion of the load detection device 10 that has been explained with reference to FIG. 4.

The first engagement portion 62 is integrally formed at the amplifier case attachment portion 61 so as to project from a surface, where the chamfer is not formed, at a most acute portion of the right triangle of the amplifier case attachment portion 61 (left rear side in FIG. 10). The circular-shaped first fitting hole 62a is formed at the first engagement portion 62. The first engagement portion 62 is arranged on the upper surface of the strain generating member 20 so that the first fitting hole 62a is coaxial with the first fixing hole 21. The second press-fitted shaft portion 133 of the first lower bush 130 is press-fitted to the first fitting hole 62a. Thus, an inner diameter of the first fitting hole 62a is specified to be smaller than a circumscribed circle diameter of the second press-fitted shaft portion 133. Further, the fixed shaft 19 is inserted into the first lower bush 130 from a lower side and the nut 18d is meshed with the fixed shaft 19 in a state where the nut 18d is in contact with an upper surface of the first engagement portion 62. As a result, the first lower bush 130, the strain generating member 20, and the first engagement portion 62 of the bracket member 60 are fixed to the upper rail 16.

The second engagement portion 63 is integrally formed at the amplifier case attachment portion 61 so as to project from a surface coplanar with the surface, where the first engagement portion 62 is formed in a projecting manner, at a bottom portion (base) of the right triangle of the amplifier case attachment portion 61 (right rear side in FIG. 10). The second engagement portion 63 is arranged so as to have a predetermined distance from the first engagement portion 62. The circular-shaped second fitting hole 63a is formed at the second engagement portion 63. An inner diameter of the second fitting hole 63a is specified to be larger than the circumscribed circular diameter of the second press-fitted shaft portion 133. Thus, the second press-fitted shaft portion 133 is prevented from being press-fitted to the second fitting hole 63a. That is, the second press-fitted shaft portion 133 is inserted into the second fitting hole 63a in a state where a clearance is formed between the second press-fitted shaft portion 133 and the second fitting hole 63a. The second engagement portion 63 is arranged on the upper surface of the strain generating member 20 in such a manner that the second fitting hole 63a and the second fixing hole 22 are substantially coaxial with each other.

At this time, the upper bush 70 is arranged on an upper surface of the second engagement portion 63. The upper bush 70, which is formed into a ring shape, includes the flat seat portion 71 having a hollow disc shape, and the cylindrical portion 72 axially projecting from an inner peripheral edge of the flat seat portion 71. The flat seat portion 71 is arranged on an upper surface of the second engagement portion 63 in an overlapping manner. The cylindrical portion 72 is inserted into the second fitting hole 63a of the second engagement portion 63. A clearance is formed between an outer peripheral surface of the cylindrical portion 72 and an, inner peripheral surface of the second fitting hole 63a. An inner diameter of the cylindrical portion 72 is specified to be smaller than the circumscribed circle diameter of the second press-fitted shaft portion 133 of the second lower bush 130. That is, the second press-fitted shaft portion 133 of the second lower bush 130 is press-fitted to the cylindrical portion 72.

The fixed shaft 19 is inserted into the second lower bush 130 from a lower side and the nut 18d is meshed with the fixed shaft 19 in a state where the nut 18d is in contact with an upper surface of the upper bush 70. As a result, the second lower bush 130, the strain generating member 20, the second engagement portion 63 of the bracket member 60, and the upper bush 70 are fixed to the upper rail 16.

The first engagement portion 62 and the second engagement portion 63 are arranged, having the predetermined distance therebetween. The ring member 50 is arranged at an area defined between the first engagement portion 62 and the second engagement portion 63.

The amplifier case 80 is made of resin such as a PBT (Polybutylene terephthalate). The amplifier case 80 includes a circuit board within which an amplifier circuit is constituted. The amplifier case 80 is formed into an elongated rectangular shape of which one corner is chamfered (front side in FIG. 10), greatly inclining, so as to match the shape of the amplifier case attachment portion 61 of the bracket member 60. A connector is provided to project from a portion of the amplifier case 80 opposite from the chamfered portion. The amplifier case 80 is fixed to a lower surface of the amplifier case attachment portion 61 so that the chamfered portions of the amplifier case 80 and the amplifier case attachment portion 61 match each other. The amplifier circuit within the amplifier case 80 communicates with an electronic control unit via the connector.

The FPC member 90 is made of an FPC (flexible printed circuit) board, having a substantially U-shape as illustrated in FIG. 10. Both ends of an opening side of the U-shape of the FPC member 90 are connected to the strain gauges G1 and G2, respectively. A center portion of the U-shape of the FPC member 90 is connected to the amplifier circuit within the amplifier case 80.

Figure 12A:
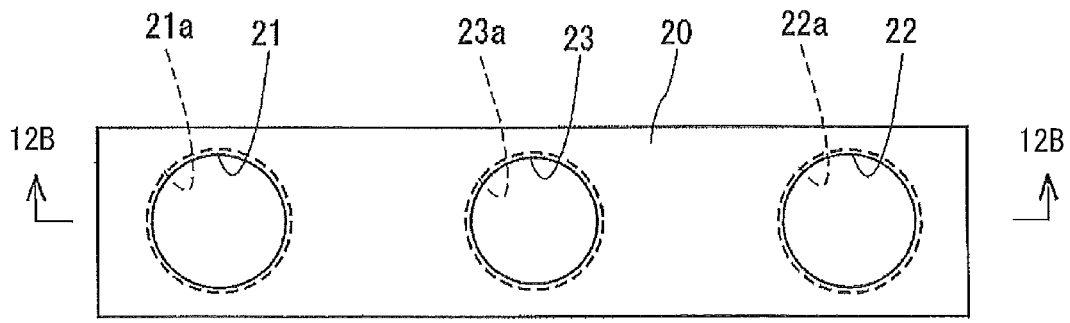
FIG. 12A is a plan view of the strain generating member according to the second embodiment.
Figure 12B:
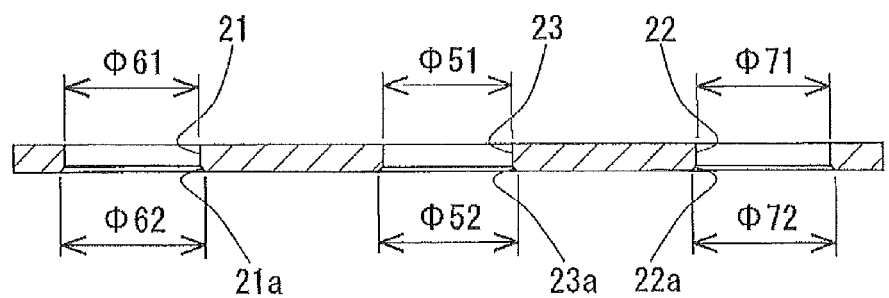
FIG. 12B is a cross-sectional view taken along line 12B-12B in FIG. 12A.
Figure 13A:
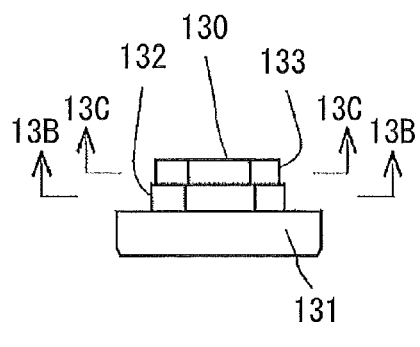
FIG. 13A is a side view of a lower bush according to the second embodiment.

Next, detailed structures of the strain generating member 20, the lower bush 130 and the connection shaft 140 will be explained with reference to FIGS. 12 to 14.

As mentioned above, the strain generating member 20 is formed into the elongated rectangular plate shape and is made of stainless steel on which the hardening process is performed. As illustrated in FIG. 12, the first, second and third tapered portions 21a, 22a, and 23a are formed at the first and second fixing holes 21, 22, and the center hole 23 of the strain generating member 20, respectively. Specifically, each of the first, second, and third tapered portions 21a, 22a, and 23a serving as a relief portion is formed at one axial end of an opening of each of the first and second fixing holes 21, 22, and the center hole 23. The one axial end of the opening of each of the holes 21, 22, and 23, where each of the first to third tapered portions 21a, 22a, and 23a are formed, is positioned at a lower side in FIG. 11.

The inner diameter of the first fixing hole 21 is $\Phi 61$ while the expanded diameter (i.e., a maximum diameter) of the first tapered portion 21a is $\Phi 62$, which is greater than the inner diameter $\Phi 61$ of the first fixing hole 21. The inner diameter of the second fixing hole 22 is $\Phi 71$ while the expanded diameter (i.e., a maximum diameter) of the second tapered portion 22a is $\Phi 72$, which is greater than the inner diameter $\Phi 71$ of the second fixing hole 22. The inner diameter of the center hole 23 is $\Phi 51$ while the expanded diameter (i.e., a maximum diameter) of the third tapered portion 23a is $\Phi 52$, which is greater than the inner diameter $\Phi 51$ of the center hole 23.

As mentioned above, the lower bush 130 is made of carbon steel, for example, so that the surface hardness of the lower bush 130 is specified to be lower than that of the strain generating member 20. The lower bush 130 includes the base portion 131 serving as the head portion, the first press-fitted shaft portion 132 serving as the shaft body, and the second press-fitted shaft portion 133.

Figure 13B:
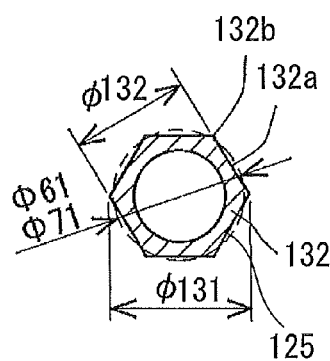
FIG. 13B is a cross-sectional view taken along line 13B-13B in FIG. 13A.

As illustrated in FIG. 13B, the axially perpendicular cross section of the outer peripheral surface of the first press-fitted shaft portion 132 is formed into a regular hexagonal shape. A circumscribed circle diameter of the first press-fitted shaft portion 132 is $\phi 131$. An inscribed circle diameter of the outer peripheral surface of the first press-fitted shaft portion 132, which corresponds to a distance between two surfaces of the regular rectangular facing each other, is $\phi 132$. The circumscribed circle diameter $\phi 131$ of the outer peripheral surface of the first press-fitted shaft portion 132 is specified to be larger than the inner diameters $\Phi 61$ and $\Phi 71$ of the first and second fixing holes 21 and 22 of the strain generating member 20. On the other hand, the inscribed circle diameter $\phi 132$ of the outer peripheral surface of the first press-fitted shaft portion 132 is specified to be smaller than the inner diameters $\Phi 61$ and $\Phi 71$ of the first and second fixing holes 21 and 22. In addition, the circumscribed circle diameter $\phi 132$ of the outer peripheral surface of the first press-fitted shaft portion 132 is specified to be smaller than the expanded diameters $\Phi 62$ and $\Phi 72$ of the first and second tapered portions 21a and 22a.

The surface hardness of the first press-fitted shaft portion 132, specifically, of areas around corner portions 132b, each serving as the scraping projecting portion, of the outer peripheral surface of the first press-fitted shaft portion 132 are specified to be lower than that of the first and second fixing holes 21 and 22 of the strain member 20. Thus, in a case where the first press-fitted shaft portion 132 is press-fitted to each of the first and second fixing holes 21 and 22, the areas around the corner portions 132b are scraped off by means of each of the first and second fixing holes 21 and 22.

In addition, intermediate portions 132a are provided adjacent to the corner portions 132b in the circumferential direction of the outer peripheral surface of the first press-fitted shaft portion 132. Specifically, each of the intermediate portions 132a, serving as the non-press-fitted portion and the relief portion, is arranged between the two adjacent corner portions 132b. When the first press-fitted shaft portion 132 is press-fitted to each of the first and second fixing holes 21 and 22 of the strain generating member 20, a pressure is prevented from being mutually applied between areas around the intermediate portions 132a and each of the first and second fixing holes 21 and 22.

As mentioned above, the first press-fitted shaft portion 132 is press-fitted to each of the first and second fixing holes 21 and 22 while the areas around the corner portions 132b are being scraped off. Thus, no pressing force is applied to the first press-fitted shaft portion 132. Accordingly, when the first press-fitted shaft portion 132 is press-fitted to each of the first and second fixing holes 21 and 22 of the strain generating member 20, an internal stress is restrained from being generated at the strain generating member 20 by means of the press-fitting of the first press-fitted shaft portion 132.

Further, because the outer peripheral surface of the first press-fitted shaft portion 132 is formed into the regular hexagonal shape in the cross section, one of the corner portions 132b is formed at a position symmetrical about an axis of the first press-fitted shaft portion 132 relative to the other one of the corner portions 132b. That is, the circumscribed circle diameter $\phi 131$ of the first-press fitted shaft portion 132 corresponds to a distance between tip ends of the two corner portions 132b facing each other. Accordingly, the circumscribed circle diameter $\phi 131$ of the first press-fitted shaft portion 132 is securely and easily measured by means of the two corner portions 132b facing each other. In addition, the axially perpendicular cross section of each of the first and second fixing holes 21 and 22 of the strain generating member 20 is formed into a circular shape. That is, the distance between the tip ends of the facing corner portions 132b is desirably specified to be larger than the inner diameter of each of the first and second fixing holes 21 and 22 of the strain generating member 20, thereby allowing a highly accurate amount of scrapings of the corner portions 132b.

A relief interspace 125 serving as the interspace is formed between the areas around the intermediate portions 132a of the outer peripheral surface of the first press-fitted shaft portion 132 and the inner peripheral surface of each of the fixing holes 21 and 22. The relief interspace 125 is provided for accommodating the scrapings in the areas around the corner portions 132b of the first press-fitted portion 132. Because the intermediate portions 132a are arranged adjacent to the corner portions 132b, the relief interspace 125 is naturally arranged adjacent to the corner portions 132b. A spatial volume of the relief interspace 125 is specified to be larger than a volume of scrapings of the areas around the corner portions 132b caused by each of the fixing holes 21 and 22. The spatial volume of the relief interspace 125 is easily specified by adjusting the inner diameters of the fixing holes 21 and 22, and the shape of the outer peripheral surface of the first press-fitted shaft portion 132.

Because the scrapings around the corner portions 132b is received within the relief interspace 125, the scrapings are prevented from interfering between the strain generating portion 20 and each of the fixing holes 21 and 22 of the strain generating member 20. That is, the scrapings around the corner potions 132b are prevented from inducing the internal stress within the strain generating member 20. As a result, the strain detection accuracy of the strain gauges G1 and G2 is enhanced. That is, the load detection accuracy of the load detection device 10 when the passenger is seated on the vehicle seat 11 is improved.

Each of the tapered portions 21a and 22a is formed at the one axial end of the opening of each of the first and second fixing holes 21 and 22 of the strain generating member 20. Because the upper surface of the base portion 131 is formed into a flat shape, a clearance defined by walls constituted by the upper surface of the base portion 131, a base portion of the first press-fitted shaft portion 132, and each of the tapered portions 21a and 22a is formed. The clearance is formed over an entire periphery of the one axial end of the opening of each of the fixing holes 21 and 22. In addition to the relief interspace 125, the clearance functions as an inter space for accommodating the scrapings around the corner portions 132b. Accordingly, the scrapings around the corner portions 132b are further prevented from inducing the internal stress within the strain generating member 20.

In addition, the expanded diameters (maximum inner diameters) Φ62 and Φ72 of the tapered portions 21a and 22a are specified to be larger than the circumscribed circle diameter φ131 of the outer peripheral surface of the first press-fitted shaft portion 132. Thus, in an early stage where the first press-fitted shaft portion 132 is press-fitted to each of the fixing holes 21 and 22 of the strain generating member 20, the positioning of the lower bush 130 relative to each of the fixing holes 21 and 22 is easily performed. As a result, the multiple corner portions 132b are uniformly scraped off, which enables the centering of the lower bush 130 relative to each of the fixing holes 21 and 22 of the strain generating member 20.

As mentioned above, the outer peripheral surface of the first press-fitted shaft portion 132 is formed into the regular hexagonal column. Thus, each of the corner portions 132b is formed to extend from one axial side to the other axial side of the first press-fitted shaft portion 132. That is, the corner portions 132b extend along the axial direction. Thus, the areas around the corner portions 132b are press-fitted to each of the fixing holes 21 and 22 of the strain generating member 20 while sequentially being scraped off. The centering and positioning of each of the lower bushes 130, 130 relative to the strain generating member 20 is further securely performed.

Further, the axially perpendicular cross section of the outer peripheral surface of the first press-fitted shaft portion 132 is formed into the regular hexagonal shape, i.e., regular polygon having even-numbered corners. Thus, side portions (i.e., intermediate portions 132a) of the polygon are stably formed accordingly. Further, because of the regular polygon having the even-numbered corners, the corner portions 132b are uniformly arranged in the circumferential direction. The centering of the first press-fitted shaft portion 132 relative to the strain generating member 20 is effectively performed.

Figure 13C:
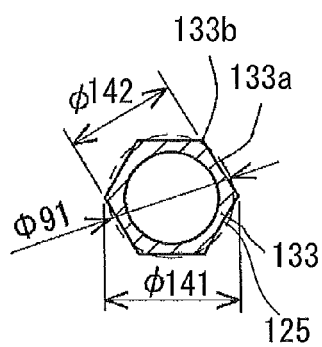
FIG. 13C is a cross-sectional view taken along line 13C-13C in FIG. 13A.

The second press-fitted shaft portion 133 has a similar shape to that of the first press-fitted shaft portion 132 but differs in a diameter which is slightly smaller than that of the first press-fitted shaft portion 132. A relationship between the second press-fitted shaft portion 133 and the first fitting hole 62a of the bracket member 60 or the upper bush 70 is substantially the same as the aforementioned relationship between the first press-fitted shaft portion 132 and each of the fixing holes 21 and 22. Specifically, as illustrated in FIG. 13C, the second press-fitted shaft portion 133 includes the areas around corner portions 133b serving as the scraping projecting portions and the areas around intermediate portions 133a serving as the non-press-fitted portions. A circumscribed circle diameter φ141 of the outer peripheral surface of the second press-fitted shaft portion 133 is larger than inner diameters Φ91 of the first fitting hole 62a of the bracket member 60 and of the upper bush 70. An inscribed circle diameter φ142 of the outer peripheral surface of the second press-fitted shaft portion 133 is specified to be smaller than the inner diameters Φ91 of the first fitting hole 62a of the bracket member 60 and of the upper bush 70. An effect caused by such structure is substantially the same as that obtained by the first press-fitted shaft portion 132.

Figure 14A:
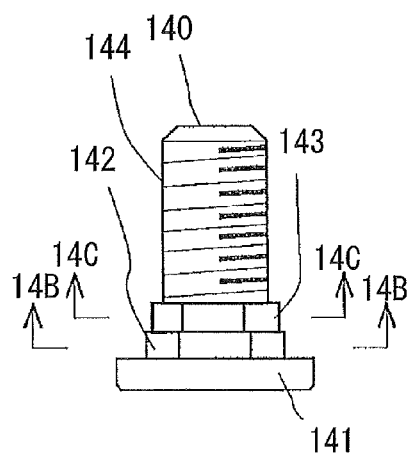
FIG. 14A is a side view of a connection shaft according to the second embodiment.
Figure 14B:
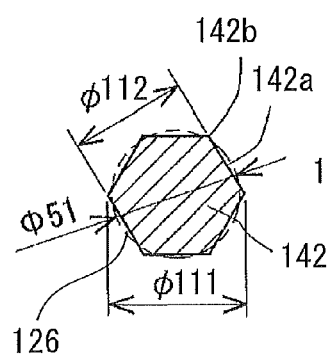
FIG. 14B is a cross-sectional view taken along line 14B-14B in FIG. 14A.
Figure 14C:
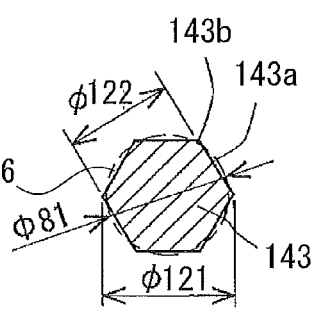
FIG. 14C is a cross-sectional view taken along line 14C-14C in FIG. 14A.

Details of the connection shaft 140 will be explained below. The connection shaft 140 made of carbon steel, for example, includes the flange 141 serving as the head portion and engaging with the strain generating member 20, the third press-fitted shaft portion 142 serving as the shaft body and being press-fitted to the center hole 23 of the strain generating member 20, the fourth press-fitted shaft portion 143 press-fitted to the ring member 50, and the fixed screw portion 144. As illustrated in FIG. 14A, an upper surface of the flange 141 is formed into a flat shape. As illustrated in FIGS. 14B and 14C, the serrations are formed at an entire outer periphery of each of the third and fourth press-fitted shaft portions 142 and 143.

As illustrated in FIG. 14B, the axially perpendicular cross section of the outer peripheral surface of the third press-fitted shaft portion 142 is formed into a regular hexagonal shape. A circumscribed circle diameter of the outer peripheral surface of the third press-fitted shaft portion 142 is φ111 while an inscribed circle diameter of the outer peripheral surface, which corresponds to a distance between the two facing sides of the regular hexagon, is φ112. The circumscribed circle diameter φ111 of the outer peripheral surface of the third press-fitted shaft portion 142 is specified to be larger than the inner diameter Φ51 of the center hole 23 of the strain generating member 20. On the other hand, the inscribed circle diameter φ112 of the outer peripheral surface of the third press-fitted shaft portion 142 is specified to be smaller than the expanded diameter Φ52 of the tapered portion 23a.

The surface hardness of the third press-fitted shaft portion 142, in particular, of areas around corner portions 142b, each serving as the scraping projecting portion, of the outer peripheral surface of the third press-fitted shaft portion 142 is specified to be lower than that of the center hole 23 of the strain generating member 20. Thus, in a case where the third press-fitted shaft portion 142 is press-fitted to the center hole 23, the areas around the corner portions 142b are scraped off by means of the center hole 23.

In addition, intermediate portions 142a are provided adjacent to the corner portions 142b in the circumferential direction of the outer peripheral surface of the third press-fitted shaft portion 142. Specifically, each of the intermediate portions 142a, serving as the non-press-fitted portion and the relief portion, is arranged between the two adjacent corner portions 142b. When the third press-fitted shaft portion 142 is press-fitted to each of the first and second fixing holes 21 and 22 of the strain generating member 20, a pressure is prevented from being mutually applied between areas around the intermediate portions 142a and each of the first and second fixing holes 21 and 22.

Further, because the outer peripheral surface of the third press-fitted shaft portion 142 is formed into the regular hexagonal shape in the cross section, one of the corner portions 142b is formed at a position symmetrical about an axis of the third press-fitted shaft portion 142 relative to the other one of the corner portions 142b. Then, a relief interspace 126 serving as the interspace is formed between the areas around the intermediate portions 142a of the outer peripheral surface of the third press-fitted shaft portion 142 and the center hole 23. The relief interspace 126 is provided for accommodating the scrapings in the areas around the corner portions 142b of the third press-fitted shaft portion 142. A spatial volume of the relieve interspace 126 is specified to be larger than a volume of the scrapings in the areas around the corner portions 142b caused by each of the fixing holes 21 and 22.

The tapered portion 23a is formed at the one axial end of the opening of the center hole 23 of the strain generating member 20. Because the upper surface of the flange 141 is formed into a flat shape, a clearance defined by walls constituted by the tapered portion 23a, the upper surface of the flange 141, and a base portion of the third press-fitted shaft portion 142 is formed. The clearance is formed over an entire periphery of the one axial end of the opening of the center hole 23. In addition to the relief interspace 126, the clearance functions as an inter space for receiving the scrapings around the areas of the corner portions 142b. The expanded diameter Φ52 of the tapered portion 23a is specified to be larger than the circumscribed circle diameter φ111 of the outer peripheral surface of the third press-fitted shaft portion 142.

Therefore, a relationship between the connection shaft 140 and the center hole 23 of the strain generating member 20 is substantially equal to the aforementioned relationship between the lower bush 130 and each of the fixing holes 21 and 22 of the strain generating member 20. Thus, in a case where the third press-fitted shaft portion 142 of the connection shaft 140 is press-fitted to the center hole 23 of the strain generating member 20, the same effect is obtained as that obtained when the first press-fitted shaft portion 132 of the lower bush 130 is press-fitted to each of the fixing holes 21 and 22 of the strain generating member 20.

The fourth press-fitted shaft portion 143 has a similar shape to that of the third press-fitted shaft portion 142 but differs in a diameter which is slightly smaller than that of the third press-fitted shaft portion 142. A relationship between the fourth press-fitted shaft portion 143 and the through-hole 51 of the ring member 50 is substantially same as the aforementioned relationship between the third press-fitted shaft portion 142 and each of the fixing holes 21 and 22. Specifically, as illustrated in FIG. 14C, the fourth press-fitted shaft portion 143 includes the areas around corner portions 143b each serving as the scraping projecting portion and the areas around intermediate portions 143a each serving as the non-press-fitted portion. A circumscribed circle diameter φ121 of the outer peripheral surface of the fourth press-fitted shaft portion 143 is larger than an inner diameter φ81 of the through-hole 51 of the ring member 50. An inscribed circle diameter φ122 of the outer peripheral surface of the fourth press-fitted shaft portion 143 is specified to be smaller than the inner diameter φ81 of the through-hole 51 of the ring member 50. An effect caused by such structure is substantially the same as that obtained by the third press-fitted shaft portion 142.

Accordingly, even when the first and second lower bushes 130, 130, and the connection shaft 140 are all press-fitted to the strain generating member 20, the generation of the internal pressure within the strain generating member 20 is securely prevented. That is, the strain detection accuracy of the strain gauges G1 and G2 is further improved. As a result, the load detection accuracy of the load detection device 10 when the passenger is seated on the vehicle seat 11 is further enhanced.

[Third Embodiment]

Next, a third embodiment will be explained with reference to FIG. 15. In the third embodiment, only a third press-fitted shaft portion 242, serving as the shaft body, of each of the connection shafts 40, 140 is different from that of the first and second embodiments. Thus, only the difference in the third embodiment from the first and second embodiments will be explained below.

Figure 15:
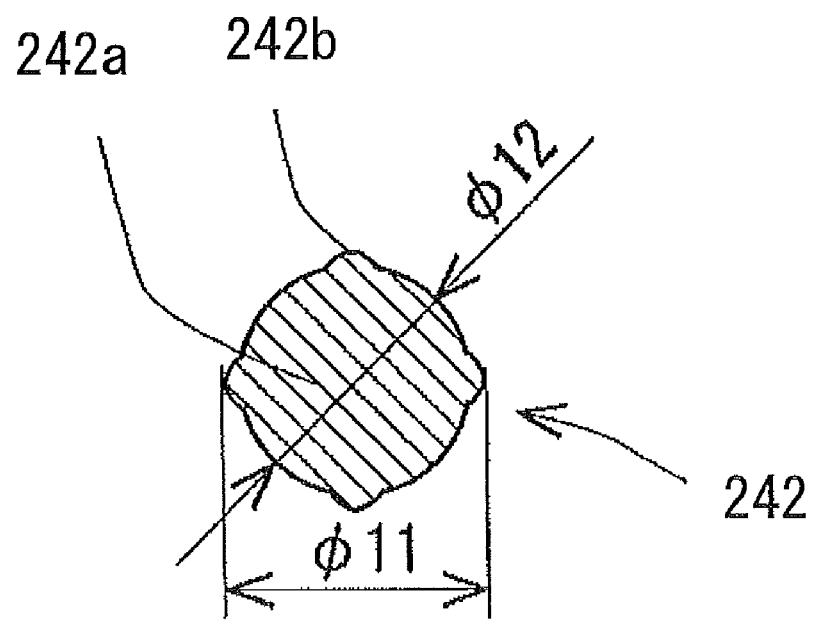
FIG. 15 is an axially perpendicular cross-sectional view of a first press-fitted shaft portion of the connection shaft according to a third embodiment disclosed here.

As illustrated in FIG. 15, the third press-fitted shaft portion 242 of the connection shaft 40, 140 includes a column-shaped shaft portion 242a serving as the non-press-fitted portion and four projecting portions 242b each serving as the scraping projecting portion formed to project radially outwardly from an outer peripheral surface of the shaft center portion 242a. The four projecting portions 242b are arranged at even intervals (i.e. at 90 degrees) in a circumferential direction of the shaft center portion 242a. Further, each of the projecting portions 242b has a wider shape than the projecting portion 42b according to the first embodiment or the corner portion 142b according to the second embodiment. The third press-fitted shaft portion 242 of each of the connection shafts 40, 140 only differs in a shape from the third press-fitted shaft portions 42, 142 of the first and second embodiments. Materials and the other requirements between the third press-fitted shaft portion 242 and the third press-fitted portions 42, 142 are the same. The projecting portions 242b of the third press-fitted shaft portion 242 also exercise the same effect as that obtained according to the first and second embodiments. The projecting portions 242b are arranged at even intervals in the circumferential direction, thereby securely obtaining the centering effect of the connection shafts 40, 140.

The feature of the third press-fitted shaft portion 242 of each of the connection shafts 40, 140 is applicable to the first press-fitted shaft portions 32, 132 of the lower bushes 30, 130. In this case, the same effect as that obtained by the third press-fitted shaft portion 242 of each of the connection shafts 40, 140 is obtainable.

[Fourth Embodiment]

A fourth embodiment will be explained with reference to FIG. 16. In the fourth embodiment, only a third press-fitted shaft portion 342, serving as the shaft body, of each of the connection shafts 40, 140 is different from the first and second embodiments. Thus, only the difference in the fourth embodiment from the first and second embodiments will be explained.

Figure 16:
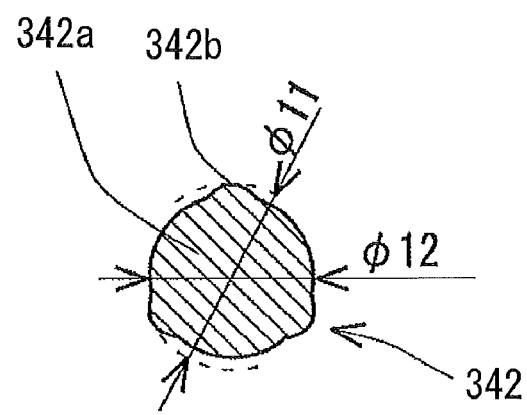
FIG. 16 is an axially perpendicular cross-sectional view of a first press-fitted shaft portion of the connection shaft according to a fourth embodiment disclosed here.

As illustrated in FIG. 16, the third press-fitted shaft portion 342 of each of the connection shafts 40, 140 includes a column-shaped shaft portion 342a serving as the non-press-fitted portion and three projecting portions 342b each serving as the scraping projecting portion formed to project from an outer peripheral surface of the shaft center portion 342a. The three projecting portions 342b are arranged at even intervals (i.e., 120 degrees) in a circumferential direction of the shaft center portion 342a. Further, each of the projecting portions 342b has a wider shape than the projecting portion 42b according to the first embodiment or the corner portion 142b according to the second embodiment. The third press-fitted shaft portion 342 of each of the connection shafts 40, 140 only differs in a shape from the third press-fitted shaft portions 42, 142 of the first and second embodiments. Materials and the other requirements between the third press-fitted shaft portion 342 and the third press-fitted shaft portions 42, 142 are the same. The projecting portions 342b of the third press-fitted shaft portion 342 also exercise the same effect as that obtained according to the first and second embodiments. The projecting portions 342b are arranged at even intervals in the circumferential direction, thereby securely obtaining the centering effect of each of the connection shafts 40, 140. However, because the projecting portions 342b are not arranged in the axially symmetrical manner, the effect caused by a case where the projecting portions 342b are arranged in the axially symmetrical manner is not obtainable.

The feature of the third press-fitted shaft portion 342 of each of the connection shafts 40, 140 is applicable to the first press-fitted shaft portions 32, 132 of the lower bushes 30, 130. In this case, the same effect as that obtained by the third press-fitted shaft portion 242 of the connection shafts 40, 140 is obtainable.

[Fifth Embodiment]

Figure 17:
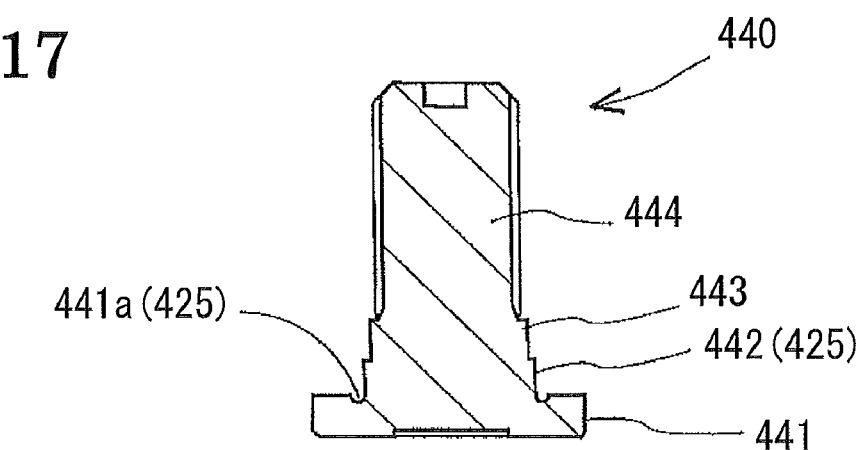
FIG. 17 is an axial cross-sectional view of a connection shaft according to a fifth embodiment disclosed here.

A fifth embodiment will be explained with reference to FIG. 17. In the fifth embodiment, only a flange 441 of a connection shaft 440 is different from the first and second embodiments. Thus, only the difference in the fifth embodiment from the first and second embodiments will be explained.

The flange 441 of the connection shaft 440 according to the fifth embodiment has a flat shape at an upper surface. A groove 441a is formed at the flange 441, at an entire periphery of a base portion of a third press-fitted shaft portion 442. Thus, a relief interspace 425 for receiving the scrapings of projecting portions is defined by walls constituted by the tapered portion 23a, the groove 441a, and the base portion of the third press-fitted shaft portion 442. Because of the groove 441a, the spatial volume of each of the relief interspaces 25, 125 according to the first and second embodiments increases.

The feature of the connection shaft 440 is applicable to the base portions 31, 131 of the lower bushes 30, 130. In this case, the same effect as that obtained by the groove 441a of the connection shaft 440 is obtainable.

According to the aforementioned first to fifth embodiments, the holes 21 to 23 of the strain generating member 20 are each formed into a circular shape. Alternatively, the holes 21 to 23 of the strain generating member 20 may be each formed into a square shape. In this case, the shape of the outer peripheral surface of each of the press-fitted shaft portions 32, 42, 132, 142 that is press-fitted to each of the holes 21 to 23 may be changed so as to match the shape of each of the holes 21 to 23.

The load detection device 10 also includes the relief portion (tapered portion) 21a, 22a, 23a provided at one axial end of an opening of the hole 21, 22, 23 and forming the relief interspace 25.

The shaft member 30, 40 includes the press-fitted shaft portion 32, 42 press-fitted to the hole 21, 22, 23 from the one axial end of the opening of the hole 21, 22, 23, the base portion or the flange 31, 41 integrally formed at one end of the press-fitted shaft portion 32, 42, and engaging with the hole 21, 22, 23, and the shaft center portion (non-press-fitted portion) 32a, 42a, arranged next to the projecting portion 32b, 42b, in a circumferential direction of the press-fitted shaft portion 32, 42 and prevented from mutually applying a pressure relative to the hole 21, 22, 23 in a case where the press-fitted shaft portion 32, 42, is press-fitted to the hole 21, 22, 23.

The tapered portion 21a, 22a, 23a is formed over an entire periphery of the one axial end of the opening of the hole 21, 22, 23.

The shaft center portion (non-press-fitted portion) 32a, 42a forms a clearance with an inner peripheral surface of the hole 21, 22, 23 after the press-fitted shaft portion 32, 42 is press-fitted to the hole 21, 22, 23.

The shaft center portion (non-press-fitted portion) 32a, 42a makes contact with an inner peripheral surface of the hole 21, 22, 23 after the press-fitted shaft portion 32, 42 is press-fitted to the hole 21, 22, 23.

The hole 21, 22, 23 has a circular shape in a cross section perpendicular to an axial direction, and the projecting portion includes a plurality of projecting portions 32b, 42b arranged at an outer periphery of the press-fitted shaft portion 32, 42 in a circumferential direction thereof, one of the projecting portions 32b, 42b being arranged at a position symmetrical to an axis of the press-fitted shaft portion 32, 42 relative to the other one of the projecting portions 32b, 42b.

The tapered portion 21a, 22a, 23a is formed at the one axial end of the opening of the hole 21, 22, 23, the tapered portion 21a, 22a, 23a of which a diameter is expanding towards the one axial end of the opening, and the tapered portion 21a, 22a, 23a is a wall surface which constitutes the relief interspace 25.

A maximum inner diameter of the tapered portion 21a, 22a, 23a is specified to be larger than a diameter of a circumscribed circle diameter of the projecting portion 32b, 42b.

The projecting portion 32b, 42b extends from one axial end to the other axial end of the press-fitted shaft portion 32, 42.

The shaft member 30, 40 includes the first shaft member 30 fixed to the upper rail 16 and the second shaft member 40 fixed to the seat frame portion 18, and the hole 21, 22, 23 formed at the strain generating member 20 includes the first hole 21, 22 and the second hole 23, the first hole 21, 22 into which the first shaft member 30 is press-fitted to cause the strain generating member 20 to be fixed to the first shaft member 30, the second hole 23 into which the second shaft member 40 is press-fitted to cause the strain generating member 20 to be fixed to the second shaft member 40.

The load detection device 10 further includes the relief portion (intermediate portion) 132a, 142a formed at the shaft member 130, 140 and positioned next to the corner portion 132b, 142b in a circumferential direction of the shaft member 130, 140, wherein the intermediate portion 132a, 142a forms the relief interspace 125, 126.

The relief portion includes the non-press-fitted portion (intermediate portion) 132a, 142a which is prevented from mutually applying a pressure relative to the hole 21, 22, 23 in a case where the shaft member 130, 140 is press-fitted to the hole 21, 22, 23.

The hole 21, 22, 23 has a circular shape in a cross section perpendicular to an axial direction, and the corner portion includes a plurality of corner portions 132b, 142b arranged at an outer periphery of the shaft member 130, 140 in a circumferential direction thereof, one of the corner portions 132b, 142b being arranged at a position symmetrical to an axis of the shaft member, 130, 140 relative to the other one of the corner portions 132b, 142b.

The corner portion 132b, 142b extends from one axial end to the other axial end of the shaft member 130, 140.

The shaft member 130, 140 includes the first shaft member 130 fixed to the upper rail 16 and the second shaft member 140 fixed to the seat frame portion 18, and the hole 21, 22, 23 formed at the strain generating member 20 includes the first hole 21, 22 and the second hole 23, the first hole 21, 22 into which the first shaft member 130 is press-fitted to cause the strain generating member 20 to be fixed to the first shaft member 130, the second hole 23 into which the second shaft member 140 is press-fitted to cause the strain generating member 20 to be fixed to the second shaft member 140.

The hole 21, 22, 23 is formed into a circular shape, and a cross section of the shaft member 130, 140 perpendicular to an axial direction thereof is formed into a polygonal shape of which a circumscribed circle diameter is specified to be greater than an inner diameter of the hole 21, 22, 23 and of which an inscribed circle diameter is specified to be smaller than the inner diameter of the hole 21, 22, 23.

The cross section of the shaft member 130, 140 perpendicular to the axial direction thereof is formed into a regular polygonal shape having even-numbered corners.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A load detection device for a vehicle seat mounted between a floor side mounting mechanism and a seat side mounting mechanism and measuring a load applied by an occupant seated on the vehicle seat, comprising:
a shaft member adapted to be fixed to one of the floor side mounting mechanism and the seat side mounting mechanism;
a strain generating member fixed to the shaft member and including a hole into which the shaft member is press-fitted for fixing the strain generating member to the shaft member, the hole possessing an inner diameter;
a strain gauge attached to the strain generating member;
the shaft member of which surface hardness is specified to be lower than a surface hardness of the hole of the strain generating member and including a scraping projecting portion possessing a maximum external diameter larger than the inner diameter of the hole, the scraping projecting portion also possessing a minimum external diameter different from the maximum external diameter and smaller than the inner diameter of the hole, the scraping projecting portion being scraped off by the hole when the shaft member is press-fitted into the hole; and
an interspace formed between the strain generating member and the shaft member and positioned next to the scraping projecting portion.

2. The load detection device according to claim 1, further comprising a relief portion provided at one axial end of an opening of the hole and forming the interspace.

3. The load detection device according to claim 2, wherein the shaft member includes a shaft body press-fitted to the hole from the one axial end of the opening of the hole, a head portion integrally formed at one end of the shaft body and engaging with the hole, and a non-press-fitted portion arranged next to the scraping projecting portion in a circumferential direction of the shaft body and prevented from mutually applying a pressure relative to the hole in a case where the shaft body is press-fitted to the hole.

4. The load detection device according to claim 2, wherein the relief portion is formed over an entire periphery of the one axial end of the opening of the hole.

5. The load detection device according to claim 3, wherein the non-press-fitted portion forms a clearance with an inner peripheral surface of the hole after the shaft body is press-fitted to the hole.

6. The load detection device according to claim 3, wherein the non-press-fitted portion makes contact with an inner peripheral surface of the hole after the shaft body is press-fitted to the hole.

7. The load detection device according to claim 2, wherein the hole has a circular shape in a cross section perpendicular to an axial direction, and the scraping projecting portion includes a plurality of scraping projecting portions arranged at an outer periphery of the shaft member in a circumferential direction thereof, one of the scraping projecting portions being arranged at a position symmetrical to an axis of the shaft member relative to the other one of the scraping projecting portions.

8. The load detection device according to claim 7, wherein a tapered portion is formed at the one axial end of the opening of the hole, the tapered portion of which a diameter is expanding towards the one axial end of the opening, and the tapered portion is a wall surface which constitutes the interspace.

9. The load detection device according to claim 8, wherein a maximum inner diameter of the tapered portion is specified to be larger than a diameter of a circumscribed circle diameter of the scraping projecting portion.

10. The load detection device according to claim 2, wherein the scraping projecting portion extends from one axial end to the other axial end of the shaft member.

11. The load detection device according to claim 2, wherein the shaft member includes a first shaft member fixed to the floor side mounting mechanism and a second shaft member fixed to the seat side mounting mechanism, and the hole formed at the strain generating member includes a first hole and a second hole, the first hole into which the first shaft member is press-fitted to cause the strain generating member to be fixed to the first shaft member, the second hole into which the second shaft member is press-fitted to cause the strain generating member to be fixed to the second shaft member.

12. The load detection device according to claim 1, further comprising a relief portion formed at the shaft member and positioned next to the scraping projecting portion in a circumferential direction of the shaft member, wherein the relief portion forms the interspace.

13. The load detection device according to claim 12, wherein the relief portion includes a non-press-fitted portion which is prevented from mutually applying a pressure relative to the hole in a case where the shaft member is press-fitted to the hole.

14. The load detection device according to claim 13, wherein the hole has a circular shape in a cross section perpendicular to an axial direction, and the scraping projecting portion includes a plurality of scraping projecting portions arranged at an outer periphery of the shaft member in a circumferential direction thereof, one of the scraping projecting portions being arranged at a position symmetrical to an axis of the shaft member relative to the other one of the scraping projecting portions.

15. The load detection device according to claim 13, wherein the scraping projecting portion extends from one axial end to the other axial end of the shaft member.

16. The load detection device according to claim 13, wherein the shaft member includes a first shaft member fixed to the floor side mounting mechanism and a second shaft member fixed to the seat side mounting mechanism, and the hole formed at the strain generating member includes a first hole and a second hole, the first hole into which the first shaft member is press-fitted to cause the strain generating member to be fixed to the first shaft member, the second hole into which the second shaft member is press-fitted to cause the strain generating member to be fixed to the second shaft member.

17. The load detection device according to claim 13, wherein the hole is formed into a circular shape, and a cross section of the shaft member perpendicular to an axial direction thereof is formed into a polygonal shape of which a circumscribed circle diameter is specified to be greater than an inner diameter of the hole and of which an inscribed circle diameter is specified to be smaller than the inner diameter of the hole.

18. The load detection device according to claim 17, wherein the cross section of the shaft member perpendicular to the axial direction thereof is formed into a regular polygonal shape having even-numbered corners.

19. The load detection device according to claim 1, wherein the projecting portion comprises serrations extending over an entire outer periphery of a center portion of the shaft member in a circumferential direction.

* * * * *